(12) United States Patent
Kang et al.

(10) Patent No.: US 12,149,955 B2
(45) Date of Patent: Nov. 19, 2024

(54) METHOD FOR TRANSMITTING UPLINK SIGNAL IN WIRELESS COMMUNICATION SYSTEM, AND APPARATUS THEREFOR

(71) Applicant: LG ELECTRONICS INC., Seoul (KR)

(72) Inventors: Jiwon Kang, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 548 days.

(21) Appl. No.: 17/593,873

(22) PCT Filed: Mar. 26, 2020

(86) PCT No.: PCT/KR2020/004138
§ 371 (c)(1),
(2) Date: Sep. 27, 2021

(87) PCT Pub. No.: WO2020/197291
PCT Pub. Date: Oct. 1, 2020

(65) Prior Publication Data
US 2022/0174510 A1 Jun. 2, 2022

(30) Foreign Application Priority Data
Mar. 28, 2019 (KR) .................. 10-2019-0036382

(51) Int. Cl.
*H04W 16/28* (2009.01)
*H04L 5/00* (2006.01)
*H04W 72/1263* (2023.01)

(52) U.S. Cl.
CPC .......... *H04W 16/28* (2013.01); *H04L 5/0051* (2013.01); *H04W 72/1263* (2013.01)

(58) Field of Classification Search
CPC .......... H04W 16/28; H04W 72/12; H04L 5/00
See application file for complete search history.

(56) References Cited

U.S. PATENT DOCUMENTS

2019/0281588 A1* 9/2019 Zhang .................. H04B 7/0617
2020/0267712 A1* 8/2020 Cirik .................... H04L 5/0023

FOREIGN PATENT DOCUMENTS

WO 2017192889 11/2017

OTHER PUBLICATIONS

PCT International Application No. PCT/KR2020/004138, International Search Report dated Jul. 17, 2020, 5 pages.

(Continued)

*Primary Examiner* — Sulaiman Nooristany
(74) *Attorney, Agent, or Firm* — LEE, HONG, DEGERMAN, KANG & WAIMEY

(57) ABSTRACT

A method for transmitting, by a terminal, an uplink signal in a wireless communication system, according to one embodiment of the present specification, comprises the steps of: receiving an upper layer message related to setting of resource groups for a plurality of panels; receiving a lower layer message related to whether the resource groups are activated; and transmitting an uplink signal on the basis of the lower layer message. The uplink signal is transmitted on the basis of an activated resource group from among the resource groups.

17 Claims, 19 Drawing Sheets

(56) References Cited

OTHER PUBLICATIONS

LG Electronics, "Discussion on multi-beam based operations and enhancements," R1-1902092, 3GPP TSG RAN WG1 Meeting #96, Mar. 2019, 12 pages.
NTT Docomo, Inc., "Discussion on multi-beam enhancement," R1-1902813, 3GPP TSG RAN WG1 #96, Mar. 2019, 22 pages.
Huawei et al., "UL multi-TRP/panel/beam operation in R15," R1-1719818, 3GPP TSG RAN WG1 Meeting #91, Dec. 2017, 4 pages.
CATT, "Consideration on multi-beam operation enhancements," R1-1810556, 3GPP TSG RAN WG1 Meeting #94bis, Oct. 2018, 7 pages.

* cited by examiner

[FIG. 1]
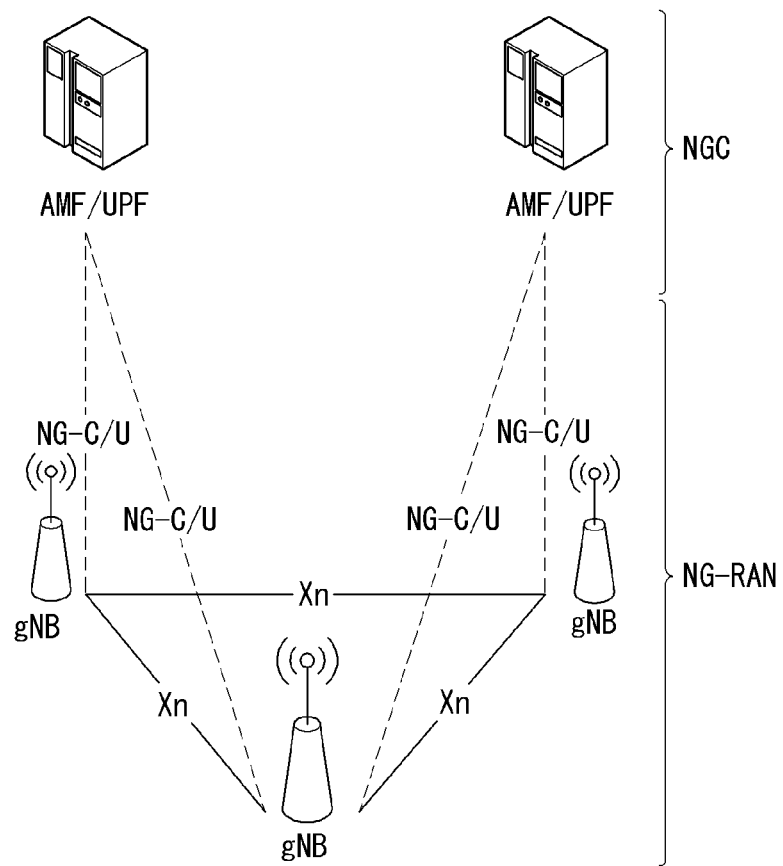

[FIG. 2]
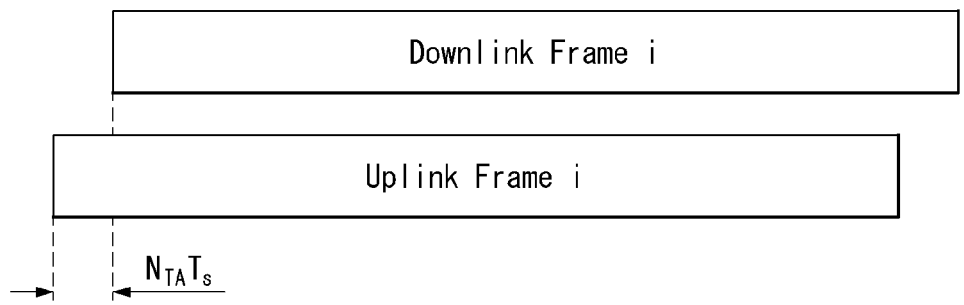

[FIG. 3]
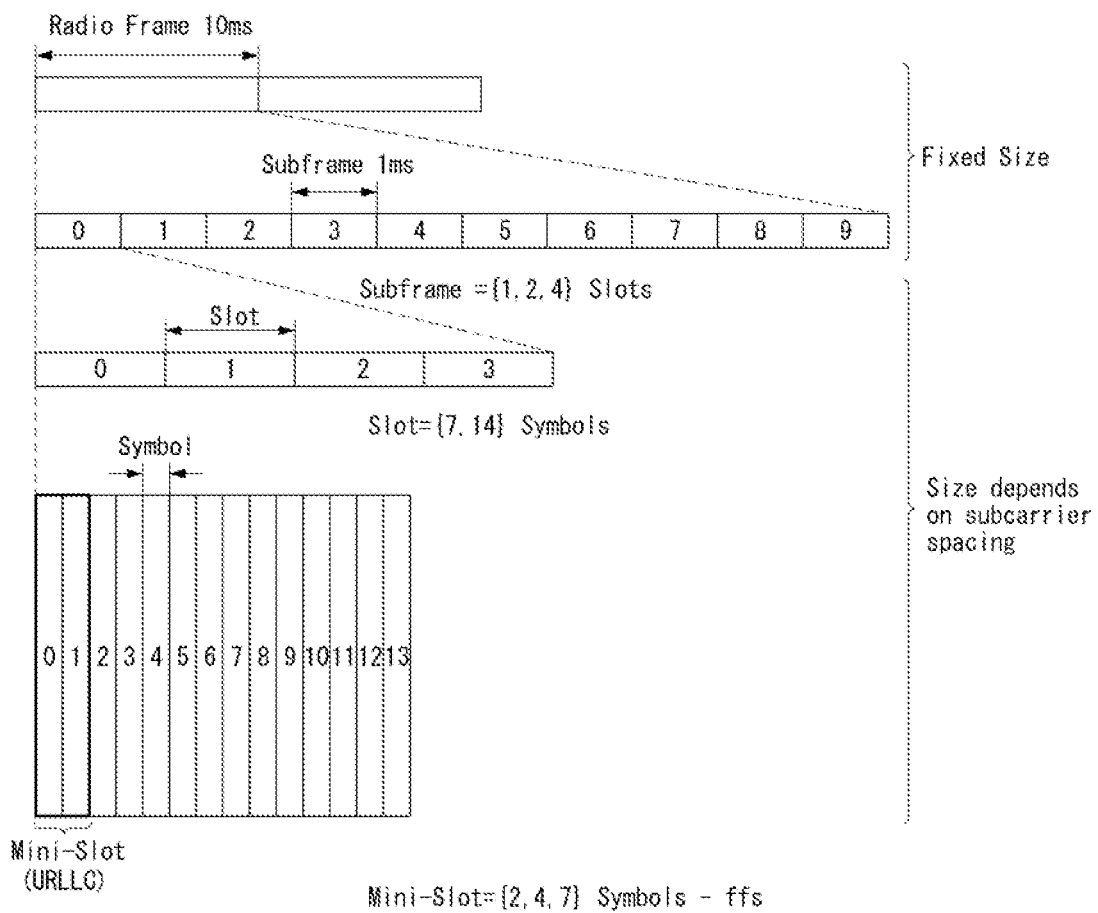

[FIG. 4]
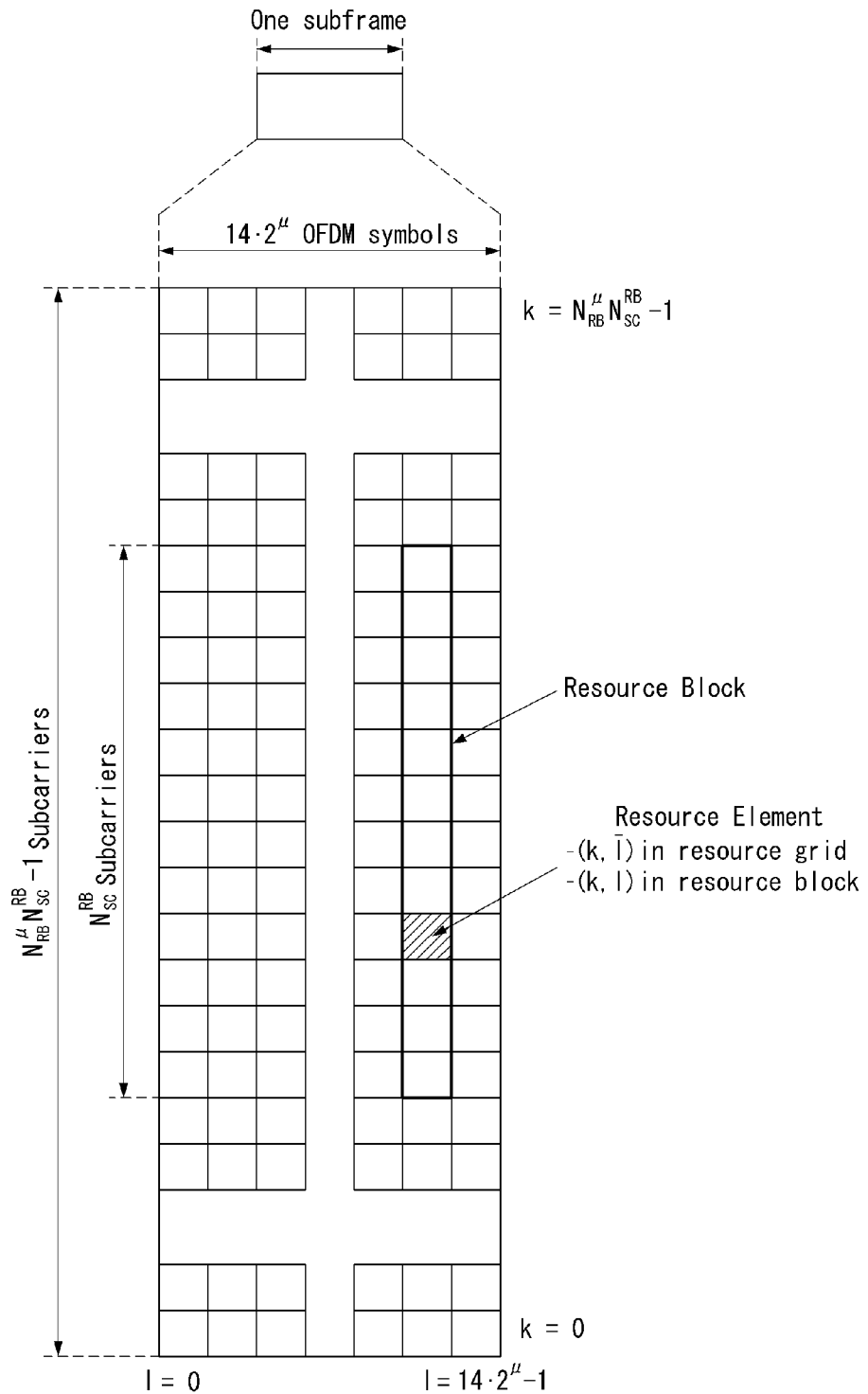

[FIG. 5]
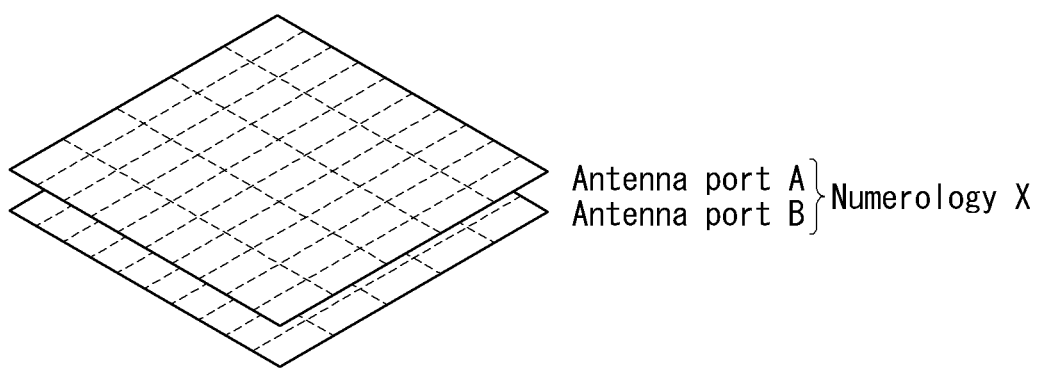
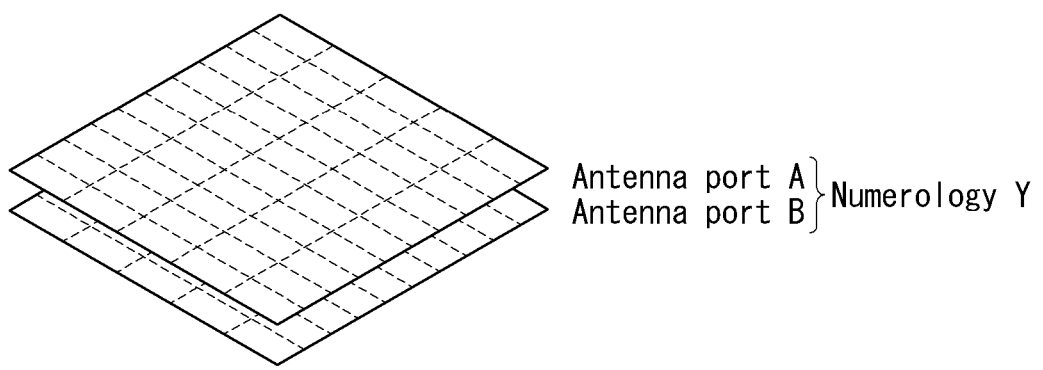

[FIG. 6]
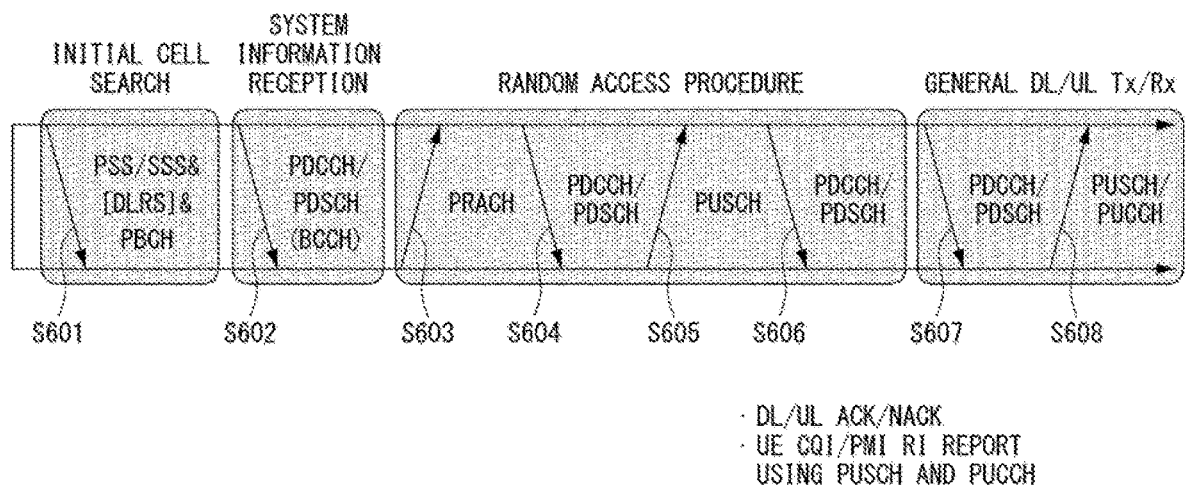

[FIG. 7]
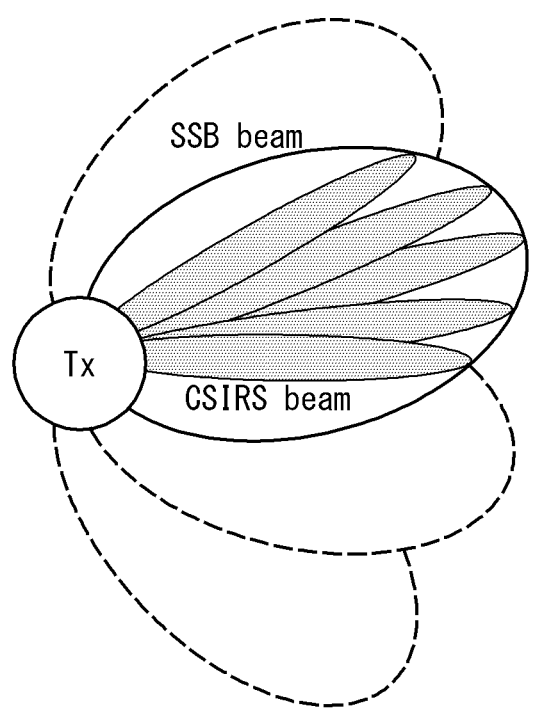

[FIG. 8]
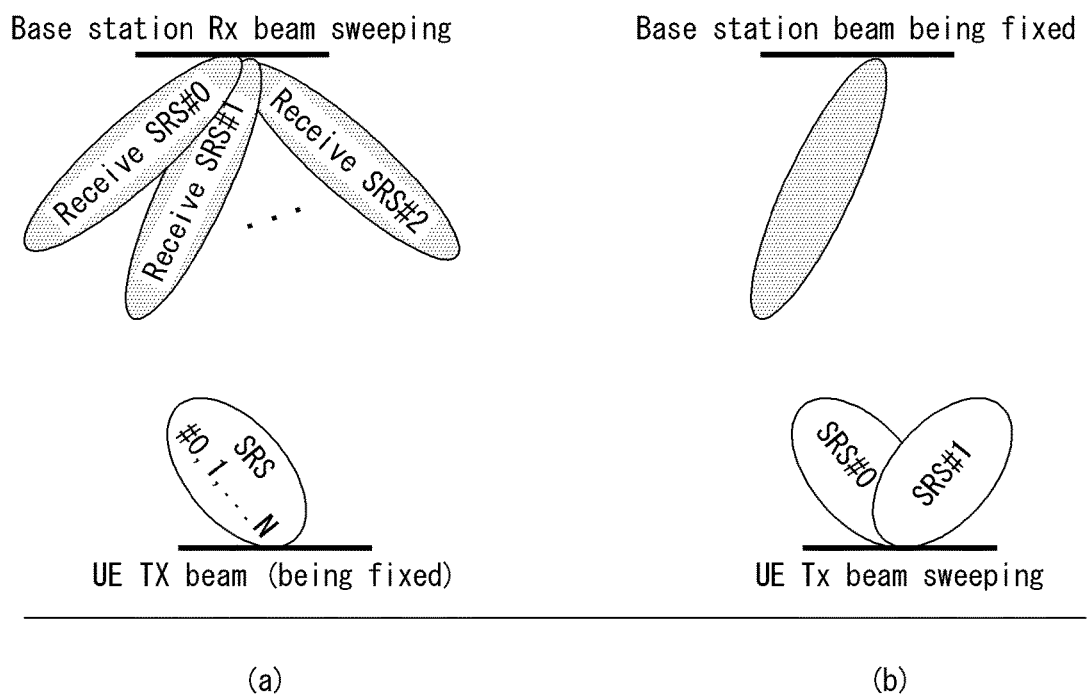
(a)          (b)

[FIG. 9]
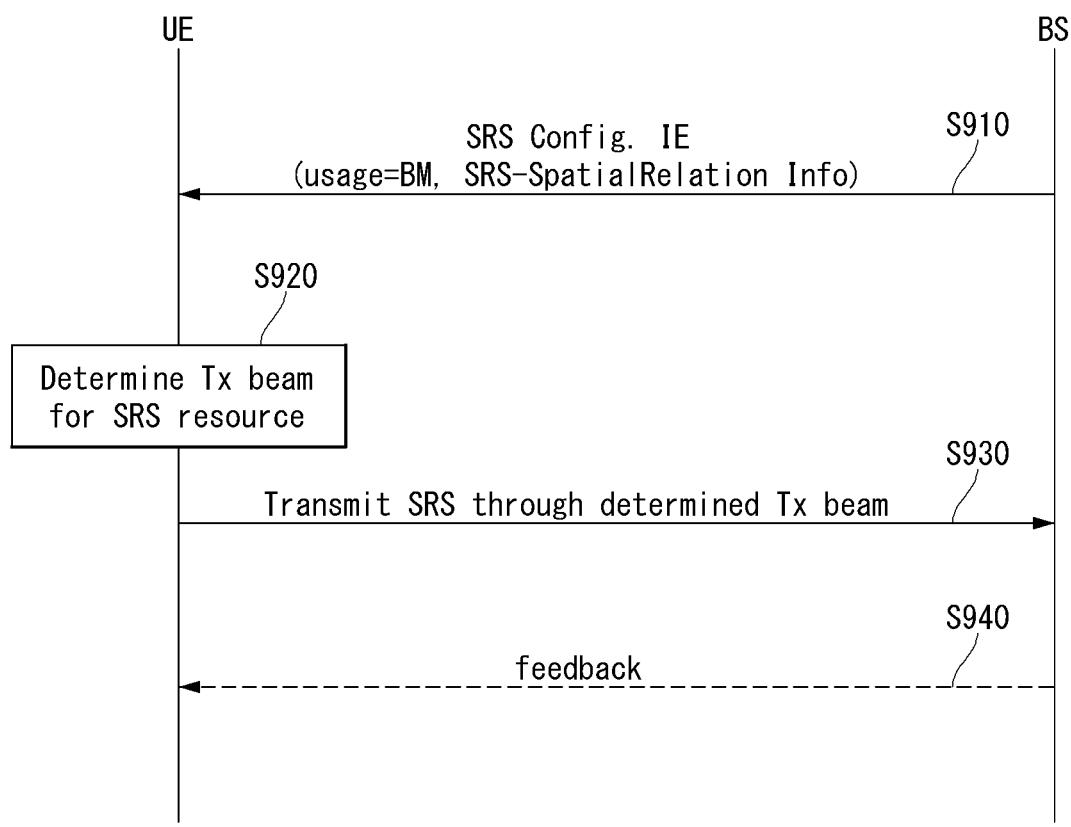

[FIG. 10]
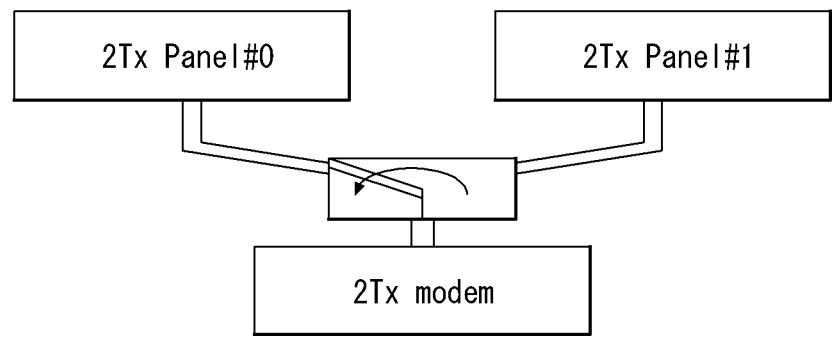

【FIG. 11】
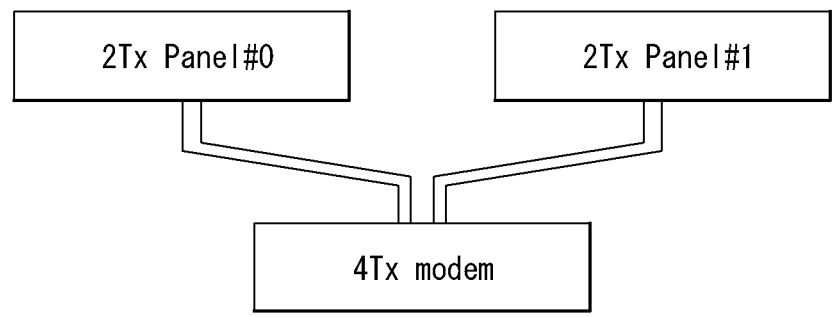

[FIG. 12]
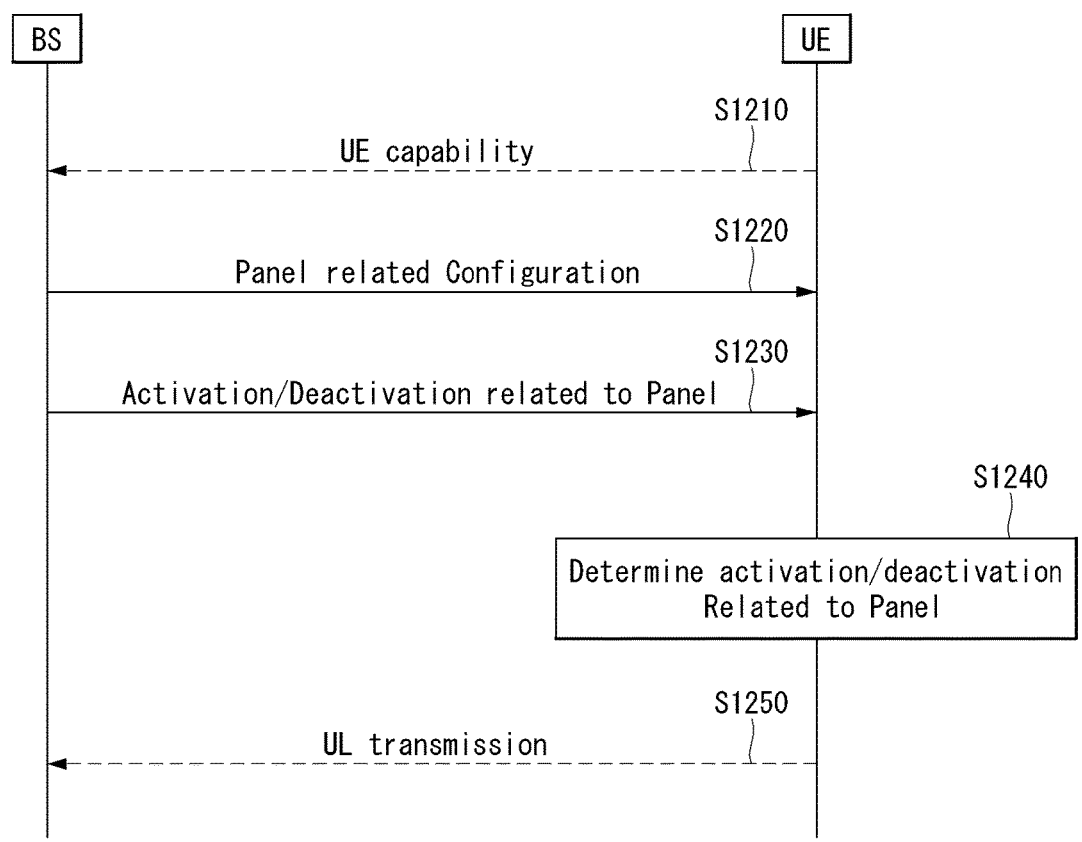

[FIG. 13]
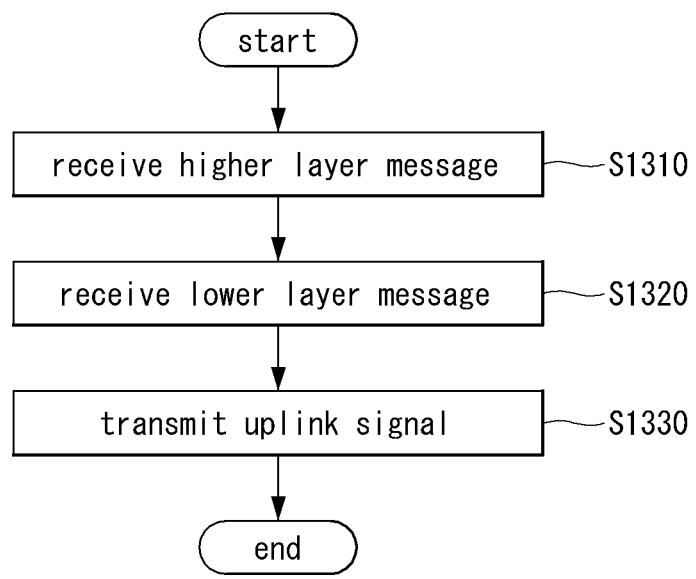

[FIG. 14]
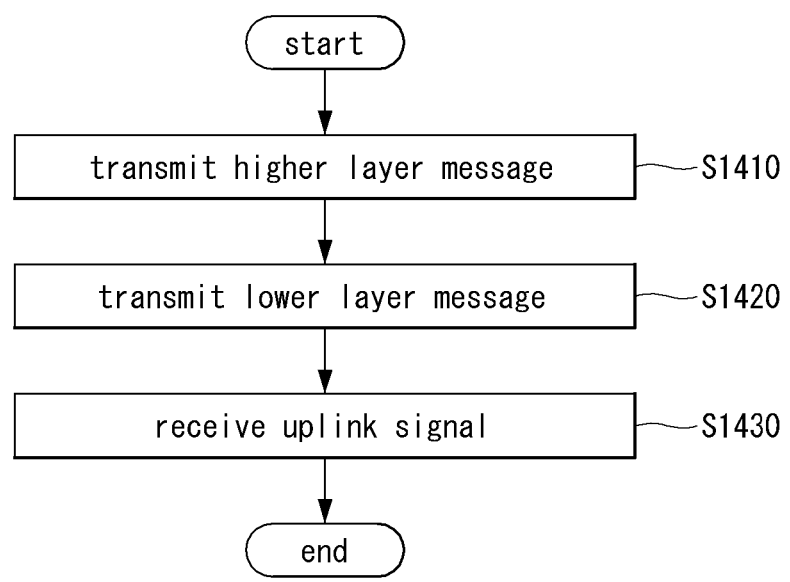

[FIG. 15]
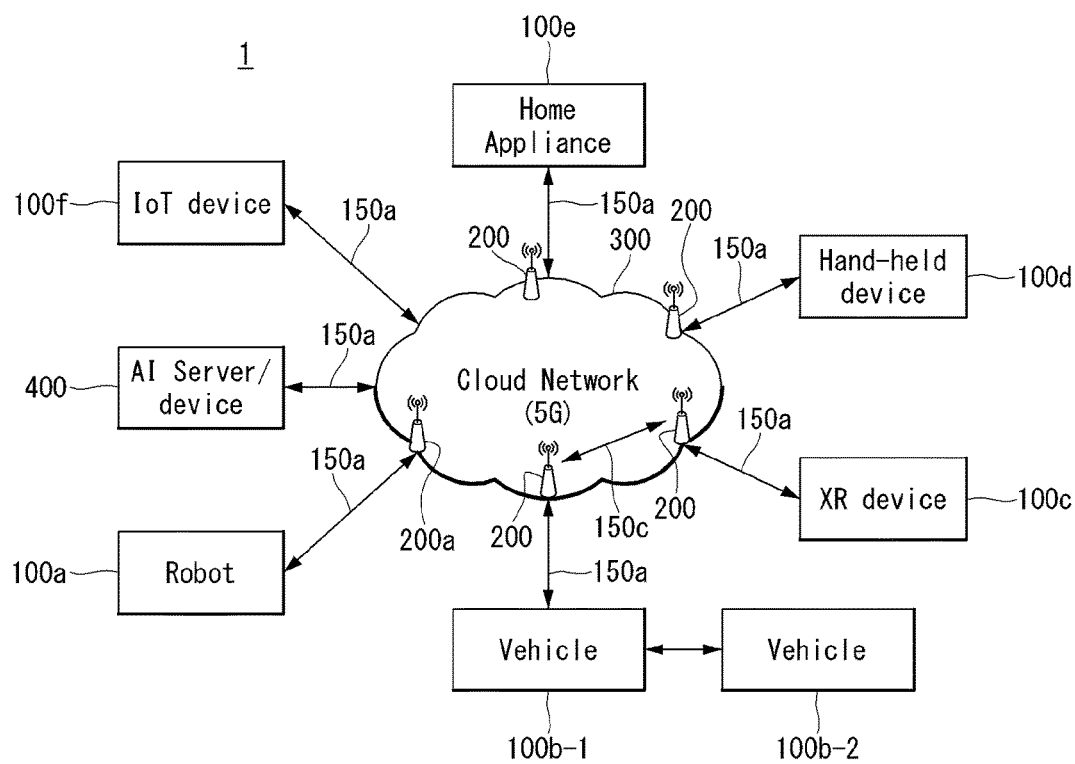

[FIG. 16]
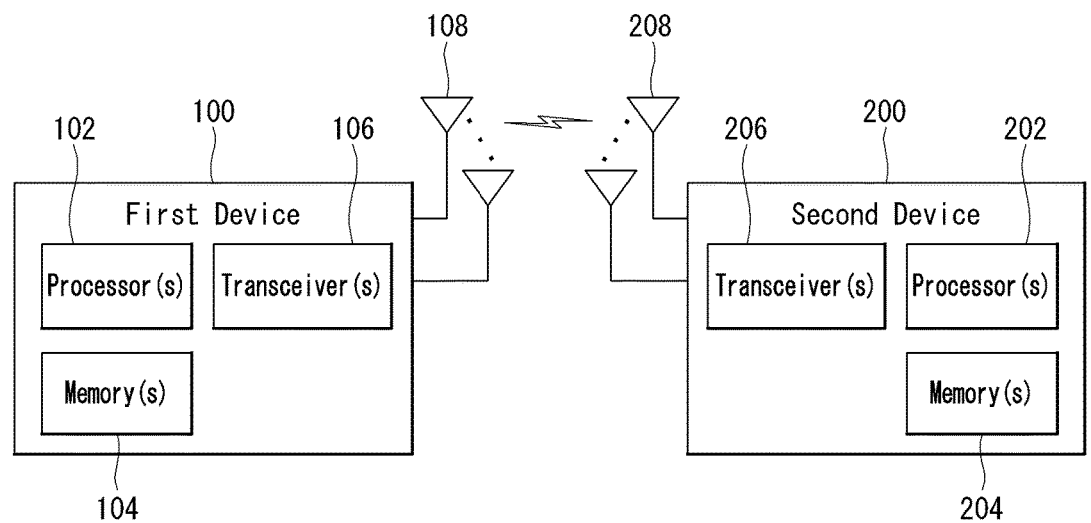

【FIG. 17】
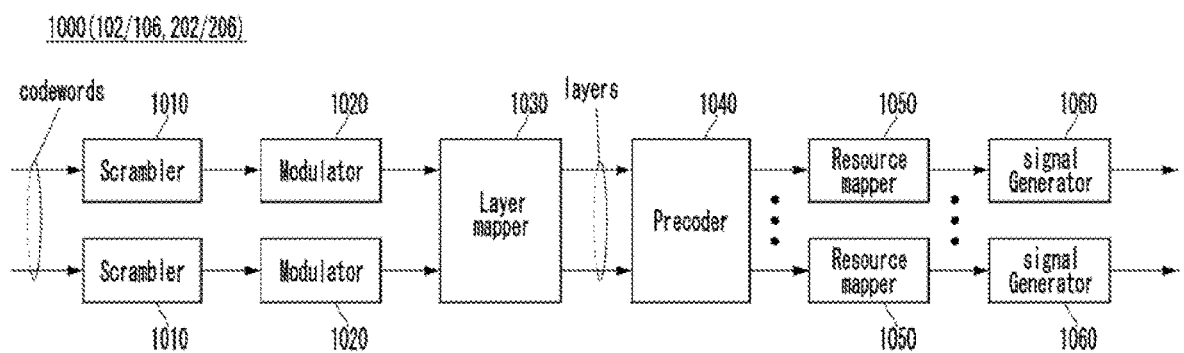

[FIG. 18]
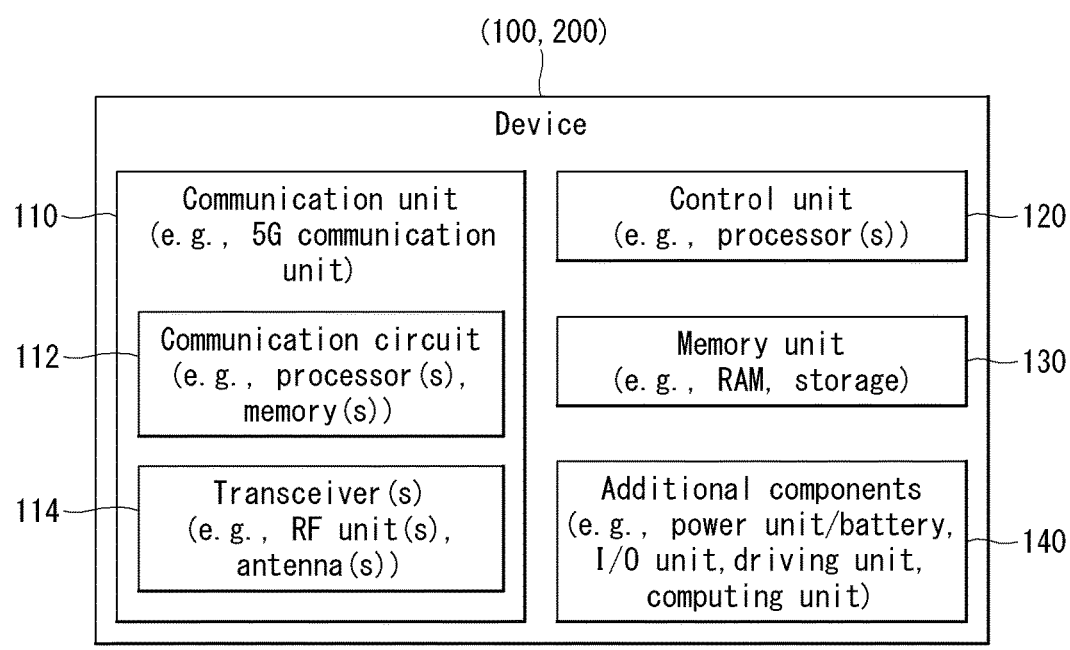

[FIG. 19]
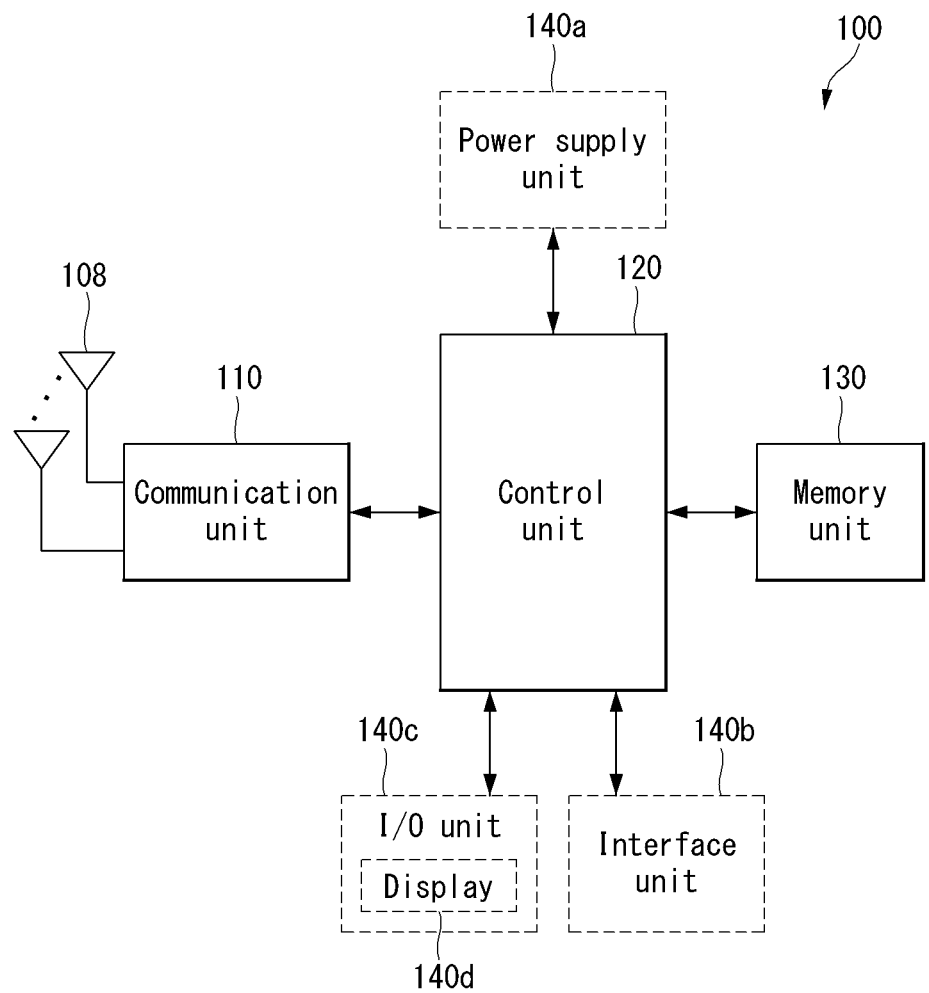

METHOD FOR TRANSMITTING UPLINK SIGNAL IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2020/004138, filed on Mar. 26, 2020, which claims the benefit of earlier filing date and right of priority to Korean Application No. 10-2019-0036382, filed on Mar. 28, 2019, the contents of which is hereby incorporated by reference herein in its entirety.

TECHNICAL FIELD

The disclosure relates to a method and device for transmitting an uplink signal in a wireless communication system.

BACKGROUND ART

Mobile communication systems have been developed to guarantee user activity while providing voice services. Mobile communication systems are expanding their services from voice only to data. Current soaring data traffic is depleting resources and users' demand for higher-data rate services is leading to the need for more advanced mobile communication systems.

Next-generation mobile communication systems are required to meet, e.g., handling of explosively increasing data traffic, significant increase in per-user transmission rate, working with a great number of connecting devices, and support for very low end-to-end latency and high-energy efficiency. To that end, various research efforts are underway for various technologies, such as dual connectivity, massive multiple input multiple output (MIMO), in-band full duplex, non-orthogonal multiple access (NOMA), super wideband support, and device networking.

DETAILED DESCRIPTION OF THE DISCLOSURE

Technical Problem

The disclosure proposes a method for multi-panel-based uplink signal transmission.

The technical objects of the disclosure are not limited to the aforementioned technical objects, and other technical objects, which are not mentioned above, will be apparently appreciated by a person having ordinary skill in the art from the following description.

Technical Solution

According to an embodiment of the disclosure, a method of transmitting an uplink signal by a user equipment (UE) in a wireless communication system comprises receiving a higher layer message related to a configuration of resource groups for a plurality of panels, receiving a lower layer message related to whether the resource groups are activated, and transmitting the uplink signal based on the lower layer message. The uplink signal is transmitted on the basis of an activated resource group from among the resource groups.

The resource group may be an SRS resource group.

The SRS resource groups may be identical in at least one of a usage or a time domain behavior.

The usage may include at least one of antenna switching, beam management, codebook based uplink (UL), or non-codebook based UL.

The time domain behavior may be an operation based on any one of periodic, aperiodic, and semi-persistent.

A different resource group may be mapped to each of the plurality of panels based on characteristic of the resource groups, and the characteristics may relate to power control or timing advance.

A different resource may be mapped to each of the plurality of panels, and the mapping may be based on a number of antenna ports of each of the plurality of panels.

Transmission of the uplink signal based on a deactivated resource group may be stopped from a specific time, based on the resource group being periodically or semi-statically scheduled, and the deactivated resource group may be regarded as an invalid resource from the specific time based on the resource group being aperiodically scheduled.

The specific time may be a time delayed by a predetermined value from a time of receiving the lower layer message, and the predetermined value may be determined based on at least one of a first time or a second time.

The first time may be a time required for decoding the lower layer message, and the second time may be a time required for an operation of a panel based on the lower layer message among the plurality of panels.

The operation of the panel may be based on at least one of activation of the panel or panel switching.

The uplink signal may be based on any one of a sounding reference signal (SRS), a physical uplink shared channel (PUSCH), a physical uplink control channel (PUCCH), or a physical random access channel (PRACH).

The activated resource group may be related to spatial relation information related to the transmission of the uplink signal or an uplink resource where the uplink signal is transmitted.

According to another embodiment of the disclosure, a UE transmitting an uplink signal in a wireless communication system comprises one or more transceivers, one or more processors, and one or more memories operably connectible to the one or more processors and storing instructions to, when the transmission of the uplink signal is executed by the one or more processors, perform operations.

The operations comprise receiving a higher layer message related to a configuration of resource groups for a plurality of panels, receiving a lower layer message related to whether the resource groups are activated, and transmitting the uplink signal based on the lower layer message. The uplink signal is transmitted on the basis of an activated resource group from among the resource groups.

The resource group may be an SRS resource group.

The SRS resource groups may be identical in at least one of a usage or a time domain behavior.

A different resource group may be mapped to each of the plurality of panels based on characteristic of the resource groups, and the characteristics may relate to power control or timing advance.

Transmission of the uplink signal based on a deactivated resource group may be stopped from a specific time, based on the resource group being periodically or semi-statically scheduled, and the deactivated resource group may be regarded as an invalid resource from the specific time based on the resource group being aperiodically scheduled.

According to still another embodiment of the disclosure, a device includes one or more memories and one or more processors functionally connected with the one or more memories.

The one or more processors are configured to enable the device to receive a higher layer message related to a configuration of resource groups for a plurality of panels, receive a lower layer message related to whether the resource groups are activated, and transmit the uplink signal based on the lower layer message. The uplink signal is transmitted on the basis of an activated resource group from among the resource groups.

According to another embodiment of the disclosure, one or more non-transitory computer-readable media store one or more instructions.

The one or more instructions executable by one or more processors are configured to control a UE to receive a higher layer message related to a configuration of resource groups for a plurality of panels, receive a lower layer message related to whether the resource groups are activated, and transmit the uplink signal based on the lower layer message.

The uplink signal is transmitted on the basis of an activated resource group from among the resource groups.

Advantageous Effects

According to an embodiment of the disclosure, an uplink signal is transmitted based on an activated resource group among resource groups for a plurality of panels. Accordingly, even when the radio channel state is different for each panel or the antenna configuration of the UE is different for each panel, the uplink signal may be effectively transmitted.

According to an embodiment of the disclosure, the resource groups for the plurality of panels may be configured through a higher layer message, and it is indicated whether the resource groups are activated through a lower layer message. Therefore, it is possible to support both a UE in which only one panel is active at a time and a UE capable of simultaneous transmission across multi-panel (STxMP).

Effects of the disclosure are not limited to the foregoing, and other unmentioned effects would be apparent to one of ordinary skill in the art from the following description.

BRIEF DESCRIPTION OF DRAWINGS

The accompanying drawings, which are included to provide a further understanding of the disclosure and constitute a part of the detailed description, illustrate embodiments of the disclosure and together with the description serve to explain the principle of the disclosure.

FIG. 1 is a diagram illustrating an example of an overall system structure of NR to which a method proposed in the disclosure is applicable.

FIG. 2 illustrates a relationship between an uplink frame and a downlink frame in a wireless communication system to which a method proposed by the disclosure is applicable.

FIG. 3 illustrates an example of a frame structure in an NR system.

FIG. 4 illustrates an example of a resource grid supported by a wireless communication system to which a method proposed in the disclosure is applicable.

FIG. 5 illustrates examples of a resource grid for each antenna port and numerology to which a method proposed in the disclosure is applicable.

FIG. 6 illustrates physical channels and general signal transmission used in a 3GPP system.

FIG. 7 illustrates an example of beamforming using SSB and CSI-RS.

FIG. 8 illustrates an example of a UL BM procedure using an SRS.

FIG. 9 is a flowchart showing an example of a UL BM procedure using the SRS.

FIG. 10 and FIG. 11 illustrate an example of multi-panel based on an RF switch applied to the disclosure.

FIG. 12 is a flowchart for describing signaling of uplink transmission considering multi-panel according to an embodiment of the disclosure.

FIG. 13 is a flowchart illustrating a method for transmitting an uplink signal by a UE in a wireless communication system according to an embodiment of the disclosure.

FIG. 14 is a flowchart illustrating a method for receiving an uplink signal by a base station in a wireless communication system according to another embodiment of the disclosure.

FIG. 15 illustrates a communication system 1 applied to the disclosure.

FIG. 16 illustrates wireless devices applicable to the disclosure.

FIG. 17 illustrates a signal process circuit for a transmission signal.

FIG. 18 illustrates another example of a wireless device applied to the disclosure.

FIG. 19 illustrates a hand-held device applied to the disclosure.

MODE FOR CARRYING OUT THE INVENTION

Hereinafter, preferred embodiments of the disclosure are described in detail with reference to the accompanying drawings. The following detailed description taken in conjunction with the accompanying drawings is intended for describing example embodiments of the disclosure, but not for representing a sole embodiment of the disclosure. The detailed description below includes specific details to convey a thorough understanding of the disclosure. However, it will be easily appreciated by one of ordinary skill in the art that embodiments of the disclosure may be practiced even without such details.

In some cases, to avoid ambiguity in concept, known structures or devices may be omitted or be shown in block diagrams while focusing on core features of each structure and device.

Hereinafter, downlink (DL) means communication from a base station to a terminal and uplink (UL) means communication from the terminal to the base station. In the downlink, a transmitter may be part of the base station, and a receiver may be part of the terminal. In the uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a roadside unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11(Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

For clarity of description, the disclosure is described based on the 3GPP communication system (e.g., LTE-A or NR), but the technical spirit of the disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. The LTE/NR may be collectively referred to as the 3GPP system. Matters disclosed in a standard document published before the disclosure may refer to a background art, terms, abbreviations, etc., used for describing the disclosure. For example, the following documents may be referenced.

3GPP LTE
- 36.211: Physical channels and modulation
- 36.212: Multiplexing and channel coding
- 36.213: Physical layer procedures
- 36.300: Overall description
- 36.331: Radio Resource Control (RRC)

3GPP NR
- 38.211: Physical channels and modulation
- 38.212: Multiplexing and channel coding
- 38.213: Physical layer procedures for control
- 38.214: Physical layer procedures for data
- 38.300: NR and NG-RAN Overall Description
- 36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. As such, the introduction of next-generation radio access technology considering enhanced mobile broadband communication (eMBB), massive MTC (mMTC), ultra-reliable and low latency communication (URLLC) is discussed, and in the disclosure, the technology is called NR for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra-reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of megabits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a New RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. By scaling a reference subcarrier spacing by an integer N, different numerologies can be defined.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network defined by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used at an NG2 reference point between new RAN and NGC.

NG-U: A user plane interface used at an NG3 reference point between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: An end point of NG-U interface.

Overview of System

FIG. 1 illustrates an example overall NR system structure to which a method as proposed in the disclosure may apply.

Referring to FIG. 1, an NG-RAN is constituted of gNBs to provide a control plane (RRC) protocol end for user equipment (UE) and NG-RA user plane (new AS sublayer/PDCP/RLC/MAC/PHY).

The gNBs are mutually connected via an Xn interface.

The gNBs are connected to the NGC via the NG interface.

More specifically, the gNB connects to the access and mobility management function (AMF) via the N2 interface and connects to the user plane function (UPF) via the N3 interface.

New RAT (NR) Numerology and Frame Structure

In the NR system, a number of numerologies may be supported. Here, the numerology may be defined by the subcarrier spacing and cyclic prefix (CP) overhead. At this time, multiple subcarrier spacings may be derived by scaling the basic subcarrier spacing by integer N (or, μ). Further, although it is assumed that a very low subcarrier spacing is not used at a very high carrier frequency, the numerology used may be selected independently from the frequency band.

Further, in the NR system, various frame structures according to multiple numerologies may be supported.

Hereinafter, an orthogonal frequency division multiplexing (OFDM) numerology and frame structure that may be considered in the NR system is described.

The multiple OFDM numerologies supported in the NR system may be defined as shown in Table 1.

TABLE 1

| μ | Δf = $2^\mu \cdot 15$ [kHz] | Cyclic prefix |
|---|---|---|
| 0 | 15 | normal |
| 1 | 30 | normal |
| 2 | 60 | Normal, Extended |
| 3 | 120 | normal |
| 4 | 240 | normal |

NR supports multiple numerologies (or subcarrier spacings (SCS)) for supporting various 5G services. For example, if SCS is 15 kHz, NR supports a wide area in typical cellular bands. If SCS is 30 kHz/60 kHz, NR supports a dense urban, lower latency and a wider carrier bandwidth. If SCS is 60 kHz or higher, NR supports a bandwidth greater than 24.25 GHz in order to overcome phase noise.

An NR frequency band is defined as a frequency range of two types FR1 and FR2. The FR1 and the FR2 may be configured as in Table 1 below. Furthermore, the FR2 may mean a millimeter wave (mmW).

TABLE 2

| Frequenc Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

With regard to the frame structure in the NR system, the size of various fields in the time domain is expressed as a multiple of time unit of $T_s = 1/(\Delta f_{max} \cdot N_f)$, where $\Delta f_{max} = 480 \cdot 10^3$, and $N_f = 4096$. Downlink and uplink transmissions is constituted of a radio frame with a period of $T_f = (\Delta f_{max} N_f / 100) \cdot T_s = 10$ ms. Here, the radio frame is constituted of 10 subframes each of which has a period of $T_{sf} = (\Delta f_{max} N_f / 1000) \cdot T_s = 1$ ms. In this case, one set of frames for uplink and one set of frames for downlink may exist.

FIG. 2 illustrates a relationship between an uplink frame and downlink frame in a wireless communication system to which a method described in the disclosure is applicable.

As illustrated in FIG. 2, uplink frame number i for transmission from the user equipment (UE) should begin $T_{TA} = N_{TA} T_s$ earlier than the start of the downlink frame by the UE.

For numerology μ, slots are numbered in ascending order of $n_s^\mu \in \{0, \ldots, N_{subframe}^{slots,\mu} - 1\}$ in the subframe and in ascending order of $n_{s,f}^\mu \in \{0, \ldots, N_{frame}^{slots,\mu} - 1\}$ in the radio frame. One slot includes consecutive OFDM symbols of $N_{symb}^\mu$, and $N_{symb}^\mu$ is determined according to the used numerology and slot configuration. In the subframe, the start of slot $n_s^\mu$ is temporally aligned with the start of $n_s^\mu N_{symb}^\mu$.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame,\mu}$ of slots per radio frame, and the number $N_{slot}^{subframe,\mu}$ of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 3 illustrates an example of a frame structure in a NR system. FIG. 3 is merely for convenience of explanation and does not limit the scope of the disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. may be considered.

Hereinafter, the above physical resources that can be considered in the NR system are described in more detail.

First, in regard to an antenna port, the antenna port is defined so that a channel over which a symbol on an antenna port is conveyed can be inferred from a channel over which another symbol on the same antenna port is conveyed. When large-scale properties of a channel over which a symbol on one antenna port is conveyed can be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the disclosure is applicable.

Referring to FIG. 4, a resource grid consists of $N_{RB}^{\mu}N_{sc}^{RB}$ subcarriers on a frequency domain, each subframe consisting of 14·2μ OFDM symbols, but the disclosure is not limited thereto.

In the NR system, a transmitted signal is described by one or more resource grids, consisting of $N_{RB}^{\mu}N_{sc}^{RB}$ subcarriers, and $2^{\mu}N_{symb}^{(\mu)}$ OFDM symbols, where $N_{RB}^{\mu} \leq N_{RB}^{max,\ \mu}$. $N_{RB}^{max,\ \mu}$ denotes a maximum transmission bandwidth and may change not only between numerologies but also between uplink and downlink.

In this case, as illustrated in FIG. 5, one resource grid may be configured per numerology μ and antenna port p.

FIG. 5 illustrates examples of a resource grid per antenna port and numerology to which a method proposed in the disclosure is applicable.

Each element of the resource grid for the numerology μ and the antenna port p is called a resource element and is uniquely identified by an index pair (k, ī), where k=0, . . . , $N_{RB}^{\mu}N_{sc}^{RB}-1$ is an index on a frequency domain, and ī=0, . . . , $2^{\mu}N_{symb}^{(\mu)}-1$ refers to a location of a symbol in a subframe. The index pair (k, ī) is used to refer to a resource element in a slot, where l=0, . . . , $N_{symb}^{\mu}-1$.

The resource element (k, ī) for the numerology μ and the antenna port p corresponds to a complex value $a_{k,\bar{l}}^{(p,\ \mu)}$. When there is no risk for confusion or when a specific antenna port or numerology is not specified, the indexes p and μ may be dropped, and as a result, the complex value may be $a_{k,\bar{l}}^{(p)}$ or $a_{k,\bar{l}}$.

Further, a physical resource block is defined as $N_{sc}^{RB}=12$ consecutive subcarriers in the frequency domain.

Point A serves as a common reference point of a resource block grid and may be obtained as follows:
offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;
absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $n_{CRB}^{\mu}$ in the frequency domain and resource elements (k, l) for the subcarrier spacing configuration μ may be given by the following Equation 1.

$$n_{CRB}^{\mu} = \left\lfloor \frac{k}{N_{sc}^{RB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. of the BWP. A relation between the physical resource block $n_{PRB}$ in $BWP^i$ and the common resource block $n_{CRB}$ may be given by the following Equation 2.

$$n_{CRB} = n_{PRB} + N_{BWP,i}^{start} \quad \text{[Equation 2]}$$

Here, $N_{BWP,i}^{start}$ may be the common resource block where the BWP starts relative to the common resource block 0.

Physical Channel and General Signal Transmission

FIG. 5 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S501). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S502).

Meanwhile, when there is no radio resource first accessing the eNB or for signal transmission, the UE may perform a Random Access Procedure (RACH) to the eNB (S503 to S506). To this end, the UE may transmit a specific sequence to a preamble through a Physical Random Access Channel (PRACH) (S503 and S505) and receive a response message (Random Access Response (RAR) message) for the preamble through the PDCCH and a corresponding PDSCH. In the case of a contention based RACH, a Contention Resolution Procedure may be additionally performed (S506).

The UE that performs the above procedure may then perform PDCCH/PDSCH reception (S507) and Physical Uplink Shared Channel (PUSCH)/Physical Uplink Control Channel (PUCCH) transmission (S508) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Beam Management (BM)

A BM procedure as layer 1 (L1)/layer 2 (L2) procedures for acquiring and maintaining a set of base station (e.g., gNB, TRP, etc.) and/or terminal (e.g., UE) beams which may be used for downlink (DL) and uplink (UL) transmission/reception may include the following procedures and terms.

Beam measurement: Operation of measuring characteristics of a beam forming signal received by the eNB or UE.

Beam determination: Operation of selecting a transmit (Tx) beam/receive (Rx) beam of the eNB or UE by the eNB or UE.

Beam sweeping: Operation of covering a spatial region using the transmit and/or receive beam for a time interval by a predetermined scheme.

Beam report: Operation in which the UE reports information of a beamformed signal based on beam measurement.

The BM procedure may be divided into (1) a DL BM procedure using a synchronization signal (SS)/physical broadcast channel (PBCH) Block or CSI-RS and (2) a UL BM procedure using a sounding reference signal (SRS). Further, each BM procedure may include Tx beam sweeping for determining the Tx beam and Rx beam sweeping for determining the Rx beam.

Downlink Beam Management (DL BM)

The DL BM procedure may include (1) transmission of beamformed DL reference signals (RSs) (e.g., CIS-RS or SS Block (SSB)) of the eNB and (2) beam reporting of the UE.

Here, the beam reporting a preferred DL RS identifier (ID)(s) and L1-Reference Signal Received Power (RSRP).

The DL RS ID may be an SSB Resource Indicator (SSBRI) or a CSI-RS Resource Indicator (CRI).

FIG. 7 illustrates an example of beamforming using a SSB and a CSI-RS.

As illustrated in FIG. 7, a SSB beam and a CSI-RS beam may be used for beam measurement. A measurement metric is L1-RSRP per resource/block. The SSB may be used for coarse beam measurement, and the CSI-RS may be used for fine beam measurement. The SSB may be used for both Tx beam sweeping and Rx beam sweeping. The Rx beam sweeping using the SSB may be performed while the UE changes Rx beam for the same SSBRI across multiple SSB bursts. One SS burst includes one or more SSBs, and one SS burst set includes one or more SSB bursts.

DL BM Related Beam Indication

A UE may be RRC-configured with a list of up to M candidate transmission configuration indication (TCI) states at least for the purpose of quasi co-location (QCL) indication, where M may be 64.

Each TCI state may be configured with one RS set. Each ID of DL RS at least for the purpose of spatial QCL (QCL Type D) in an RS set may refer to one of DL RS types such as SSB, P-CSI RS, SP-CSI RS, A-CSI RS, etc.

Initialization/update of the ID of DL RS(s) in the RS set used at least for the purpose of spatial QCL may be performed at least via explicit signaling.

Table 5 represents an example of TCI-State IE.

The TCI-State IE associates one or two DL reference signals (RSs) with corresponding quasi co-location (QCL) types.

TABLE 5

-- ASN1START
-- TAG-TCI-STATE-START
TCI-State ::=           SEQUENCE {
  tci-StateId             TCI-StateId,
  qcl-Type1               OCL-Info,
  qcl-Type2               QCL-Info
  ...
}
QCL-Info ::=            SEQUENCE {
  cell                    ServCellIndex
  bwp-Id                  BWP-Id TABLE 5-continued referenceSignal         CHOICE {
    csi-rs                  NZP-CSI-RS-ResourceId,
    ssb                     SSB-Index
  },
  qcl-Type                ENUMERATED {typeA, typeB, typeC, typeD},
  ...
-- TAG-TCI-STATE-STOP
-- ASN1STOP In Table 5, bwp-Id parameter represents a DL BWP where the RS is located, cell parameter represents a carrier where the RS is located, and reference signal parameter represents reference antenna port(s) which is a source of quasi co-location for corresponding target antenna port(s) or a reference signal including the one. The target antenna port(s) may be CSI-RS, PDCCH DMRS, or PDSCH DMRS. As an example, in order to indicate QCL reference RS information on NZP CSI-RS, the corresponding TCI state ID may be indicated to NZP CSI-RS resource configuration information. As another example, in order to indicate QCL reference information on PDCCH DMRS antenna port(s), the TCI state ID may be indicated to each CORESET configuration. As another example, in order to indicate QCL reference information on PDSCH DMRS antenna port(s), the TCI state ID may be indicated via DCI.

Quasi-Co Location (QCL)

The antenna port is defined so that a channel over which a symbol on an antenna port is conveyed can be inferred from a channel over which another symbol on the same antenna port is conveyed. When properties of a channel over which a symbol on one antenna port is conveyed can be inferred from a channel over which a symbol on another antenna port is conveyed, the two antenna ports may be considered as being in a quasi co-located or quasi co-location (QC/QCL) relationship.

The channel properties include one or more of delay spread, Doppler spread, frequency/Doppler shift, average received power, received timing/average delay, and spatial RX parameter. The spatial Rx parameter means a spatial (reception) channel property parameter such as an angle of arrival.

The UE may be configured with a list of up to M TCI-State configurations within the higher layer parameter PDSCH-Config to decode PDSCH according to a detected PDCCH with DCI intended for the corresponding UE and a given serving cell, where M depends on UE capability.

Each TCI-State contains parameters for configuring a quasi co-location relationship between one or two DL reference signals and the DM-RS ports of the PDSCH.

The quasi co-location relationship is configured by the higher layer parameter qcl-Type1 for the first DL RS and qcl-Type2 for the second DL RS (if configured). For the case of two DL RSs, the QCL types are not the same, regardless of whether the references are to the same DL RS or different DL RSs.

The quasi co-location types corresponding to each DL RS are given by the higher layer parameter qcl-Type of QCL-Info and may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, if a target antenna port is a specific NZP CSI-RS, the corresponding NZP CSI-RS antenna ports may be indicated/configured to be QCLed with a specific TRS in terms of QCL-TypeA and with a specific SSB in terms of QCL-TypeD. The UE receiving the indication/configuration may receive the corresponding NZP CSI-RS using the Doppler or delay value measured in the QCL-TypeA TRS and apply the Rx beam used for QCL-TypeD SSB reception to the reception of the corresponding NZP CSI-RS reception.

The UE may receive an activation command by MAC CE signaling used to map up to eight TCI states to the codepoint of the DCI field 'Transmission Configuration Indication'.

UL BM Procedure

A UL BM may be configured such that beam reciprocity (or beam correspondence) between Tx beam and Rx beam is established or not established depending on the UE implementation. If the beam reciprocity between Tx beam and Rx beam is established in both a base station and a UE, a UL beam pair may be adjusted via a DL beam pair. However, if the beam reciprocity between Tx beam and Rx beam is not established in any one of the base station and the UE, a process for determining the UL beam pair is necessary separately from determining the DL beam pair.

Even when both the base station and the UE maintain the beam correspondence, the base station may use a UL BM procedure for determining the DL Tx beam even if the UE does not request a report of a (preferred) beam.

The UM BM may be performed via beamformed UL SRS transmission, and whether to apply UL BM of an SRS resource set is configured by the (higher layer parameter) usage. If the usage is set to 'BeamManagement (BM)', only one SRS resource may be transmitted to each of a plurality of SRS resource sets in a given time instant.

The UE may be configured with one or more sounding reference symbol (SRS) resource sets configured by (higher layer parameter) SRS-ResourceSet (via higher layer signaling, RRC signaling, etc.). For each SRS resource set, the UE may be configured with K≥1 SRS resources (higher later parameter SRS-resource), where K is a natural number, and a maximum value of K is indicated by SRS capability.

In the same manner as the DL BM, the UL BM procedure may be divided into a UE's Tx beam sweeping and a base station's Rx beam sweeping.

FIG. 8 illustrates an example of an UL BM procedure using an SRS.

More specifically, (a) of FIG. 8 illustrates an Rx beam determination procedure of a base station, and (a) of FIG. 8 illustrates a Tx beam sweeping procedure of a UE.

FIG. 9 is a flow chart illustrating an example of an UL BM procedure using an SRS.

The UE receives, from the base station, RRC signaling (e.g., SRS-Config IE) including (higher layer parameter) usage parameter set to 'beam management' in S910.

Table 6 represents an example of SRS-Config information element (IE), and the SRS-Config IE is used for SRS transmission configuration. The SRS-Config IE contains a list of SRS-Resources and a list of SRS-Resource sets. Each SRS resource set means a set of SRS resources.

The network may trigger transmission of the SRS resource set using configured aperiodicSRS-ResourceTrigger (L1 DCI).

TABLE 6

```
-- ASN1START
-- TAG-MAC-CELL-GROUP-CONFIG-START
SRS-Config ::=                              SEQUENCE {
    srs-ResourceSetToReleaseList            SEQUENCE (SIZE(1..maxNrofSRS-
ResourceSets)) OF SRS-ResourceSetId         OPTIONAL, -- Need N
    srs-ResourceSetToAddModList             SEQUENCE (SIZE(1..maxNrofSRS-
ResourceSets)) OF SRS-ResourceSet           OPTIONAL, -- Need N
    srs-ResourceToReleaseList               SEQUENCE (SIZE(1..maxNrofSRS-
Resources)) OF SRS-ResourceId               OPTIONAL, -- Need N
    srs-ResourceToAddModList                SEQUENCE (SIZE(1..maxNrofSRS-
Resources)) OF SRS-Resource                 OPTIONAL, -- Need N
    tpc-Accumulation                        ENUMERATED (disabled)
    ...
}
SRS-ResourceSet ::-                         SEQUENCE {
    srs-ResourceSetId                       SRS-ResourceSetId,
    srs-ResourceIdList                      SEQUENCE (SIZE(1..maxNrofSRS-
ResourcesPerSet)) OF SRS-ResourceId         OPTIONAL, -- Cond Setup
    resourceType                            CHOICE {
        aperiodic                           SEQUENCE {
            aperiodicSRS-ResourceTrigger            INTEGER (1..maxNrofSRS-
TriggerStates-1),
            csi-RS                                  NZP-CSI-RS-ResourceId
            slotOffset                              INTEGER (1..32)
            ...
        },
        semi-persistent                     SEQUENCE {
            associatedCSI-RS                        NZR-CSI-RS-ResourceId
            ...
        },
        periodic                            SEQUENCE {
            associatedCSI-RS                        NZP-CSI-RS-ResourceId
            ...
        }
    },
    usage                                   ENUMERATED {beamManagement,
codebook, nonCodebook, antennaSwitching},
    alpha                                   Alpha
    P0                                      INTEGER (-202..24)
```

TABLE 6-continued

```
pathlossReferenceRS              CHOICE {
   ssb-Index                        SSB-Index,
   csi-RS-Index                     NZR-CSI-RS-ResourceId
SRS-SpatialRelationInfo ::=      SEQUENCE {
   servingCellId                    ServCellIndex
   referenceSignal                  CHOICE {
      ssb-Index                        SSB-Index,
      csi-RS-Index                     NZP-CSI-RS-ResourceId,
      srs                              SEQUENCE {
         resourceId                       SRS-ResourceId,
         uplinkBWP                        BWP-Id
      }
   }
}
}
SRS-ResourceId ::-              INTEGER (0..maxNrofSRS-Resources-1)
```

In Table 6, usage refers to a higher layer parameter to indicate whether the SRS resource set is used for beam management or is used for codebook based or non-codebook based transmission. The usage parameter corresponds to L1 parameter 'SRS-SetUse'. 'spatialRelationInfo' is a parameter representing a configuration of spatial relation between a reference RS and a target SRS. The reference RS may be SSB, CSI-RS, or SRS which corresponds to L1 parameter 'SRS-SpatialRelationInfo'. The usage is configured per SRS resource set.

- The UE determines the Tx beam for the SRS resource to be transmitted based on SRS-SpatialRelation Info contained in the SRS-Config IE in S920. The SRS-SpatialRelation Info is configured per SRS resource and indicates whether to apply the same beam as the beam used for SSB, CSI-RS, or SRS per SRS resource. Further, SRS-SpatialRelationInfo may be configured or not configured in each SRS resource.

If the SRS-SpatialRelationInfo is configured in the SRS resource, the same beam as the beam used for SSB, CSI-RS or SRS is applied for transmission. However, if the SRS-SpatialRelationInfo is not configured in the SRS resource, the UE randomly determines the Tx beam and transmits the SRS via the determined Tx beam in S930.

More specifically, for P-SRS with 'SRS-ResourceConfigType' set to 'periodic':

i) if SRS-SpatialRelationInfo is set to SSB/PBCH,' the UE transmits the corresponding SRS resource with the same spatial domain transmission filter (or generated from the corresponding filter) as the spatial domain Rx filter used for the reception of the SSB/PBCH; or ii) if SRS-SpatialRelationInfo is set to 'CSI-RS,' the UE transmits the SRS resource with the same spatial domain transmission filter used for the reception of the periodic CSI-RS or SP CSI-RS; or iii) if SRS-SpatialRelationInfo is set to SRS,' the UE transmits the SRS resource with the same spatial domain transmission filter used for the transmission of the periodic SRS.

Even if SRS-ResourceConfigType' is set to SP-SRS' or 'AP-SRS,' the beam determination and transmission operations may be applied similar to the above.

Additionally, the UE may receive or may not receive feedback for the SRS from the base station, as in the following three cases in S940.

i) If Spatial_Relation_Info is configured for all the SRS resources within the SRS resource set, the UE transmits the SRS with the beam indicated by the base station. For example, if the Spatial_Relation_Info indicates all the same SSB, CRI, or SRI, the UE repeatedly transmits the SRS with the same beam. This case corresponds to (a) of FIG. 8 as the usage for the base station to select the Rx beam.

ii) The Spatial_Relation_Info may not be configured for all the SRS resources within the SRS resource set. In this case, the UE may perform transmission while freely changing SRS beams. That is, this case corresponds to (b) of FIG. 8 as the usage for the UE to sweep the Tx beam.

iii) The Spatial_Relation_Info may be configured for only some SRS resources within the SRS resource set. In this case, the UE may transmit the configured SRS resources with the indicated beam, and transmit the SRS resources, for which Spatial_Relation_Info is not configured, by randomly applying the Tx beam.

PUCCH Beam Indication

When the base station indicates, to the UE, a beam for use in PUCCH transmission, spatial relation info may be indicated/configured like the SRS. Spatial relation info may be SSB, CSI-RS, or SRS like SRS and provides reference RS information from the viewpoint of a beam to be used for PUCCH transmission as a target. In the case of PUCCH, a beam may be (differently) configured/indicated in units of PUCCH resources, and two schemes are supported. The first scheme is a method for always applying the corresponding spatial relation RS if transmitting the corresponding PUCCH if one spatial relation info is configured with the RRC message (i.e., RRC only). The second scheme is a method for indicating a specific one to be applied to a target PUCCH resource among a plurality of spatial relation RS information configured as RRC with a MAC-CE message after configuring two or more spatial relation info with an RRC message (that is, RRC+MAC-CE).

PUSCH Beam Indication

When the base station indicates, to the UE, a beam to be used for PUSCH transmission, with DCI format 0_1, an SRS resource serving as a reference may be indicated. In NR PUSCH transmission, two schemes are supported: a codebook (CB) based transmission scheme and a non-codebook based transmission scheme. Similar to LTE UL MIMO, the CB based transmission scheme indicates precoder information to be applied to a plurality of UE antenna ports to DCI through TPMI and TRI. However, unlike LTE, beamformed SRS resource transmission may be supported, and up to two SRS resources may be configured for CB based transmission. Since each SRS resource may be configured with different spatial relation info, it may be transmitted while beamformed in different directions. The base station receiving this may designate one of the two beams to be used when applying the PUSCH as a 1-bit SRS resource ID (SRI) field of DCI. For example, if a 4 Tx UE is configured with two 4-port SRS resources and each SRS resource is configured with a different spatial relation RS, each SRS resource is beamformed according to each spatial relation RS and each is transmitted to 4 ports. The base station selects and indicates one of the two SRS resources as SRI while simultaneously indicating TPMI and TRI together, as MIMO precoding information to be applied to SRS ports, which have been used for SRS resource transmission, as UL DCI. In non-CB based transmission, the UE may be configured with up to 4 1-port SRS resources. The UE indicated with this beamforms each SRS resource according to the spatial relation info and transmits it to the base station. Upon receiving it, the base station indicates one or more SRI(s) to be applied for PUSCH transmission. Unlike the CB based scheme, in the non-CB scheme, each SRS resource is configured with only 1 port, so that TPMI is not indicated. Resultantly, the number of SRS resources indicated (i.e., the number of SRIs) becomes identical to the transmission rank, and thus, the TRI is not indicated. As a result, the same beamforming (precoding) as a specific PUSCH DMRS port (or layer) is applied to each indicated 1 port SRS resource. In non-CB UL transmission, a specific NZP CSI-RS resource may be associated with each SRS resource by RRC (associatedCSI-RS IE in 38.331) and, when so configured, the associated NZP CSI-RS is also triggered when the aperiodic SRS for non-CB is triggered with DCI. In this case, the UE receives the triggered NZP CSI-RS, calculates a beam coefficient (or precoder) to be applied to each SRS resource (using channel reciprocity), and then transmits the SRS resources (sequentially).

When the base station schedules the PUSCH in DCI format 0_0, the direct beam indication method through DCI is not supported because the SRI field in the CB based or non-CB based transmission does not exist in DCI format 0_0. In this case, the UE transmits the corresponding PUSCH using the same beam as the beam to be applied to transmission of the PUCCH resource having the lowest ID among the PUCCH resources configured in the active BWP of the corresponding cell (that is, the spatial relation info is the same).

The foregoing description (e.g., 3GPP system, frame structure, NR system) may be applied in combination with the methods proposed in the disclosure or may be added up to clarify the technical characteristics of the methods proposed in the disclosure. Further, the embodiments and/or methods described in the disclosure are differentiated solely for ease of description, and some components in any one method may be replaced, or combined with components of another method.

In the implementation of a UE in a high frequency band, modeling of a UE having a plurality of panels consisting of one or a plurality of antennas is being considered (e.g., bi-directional two panels in 3GPP UE antenna modeling). Various forms may be considered in implementing such a multi-panel. This is described below in detail with reference to FIGS. 10 and 11.

FIG. 10 and FIG. 11 illustrate an example of multi-panel based on an RF switch applied to the disclosure.

A plurality of panels may be implemented based on an RF switch.

Referring to FIG. 10, only one panel may be activated at a time, and signal transmission may be impossible for a predetermined time during which the activated panel is changed (i.e., panel switching).

FIG. 11 illustrates a plurality of panels according to different implementation schemes. Each panel may have an RF chain connected thereto so that it may be activated at any time. In this case, the time taken for panel switching may be zero or very short, and depending on the modem and power amplifier configuration, multiple panels may be simultaneously activated to transmit signals simultaneously (STxMP: simultaneous transmission across multi-panel).

In a UE having a plurality of panels described above, the radio channel state may be different for each panel, and the RF/antenna configuration may be different for each panel. Therefore, a method for estimating a channel for each panel is required. In particular, 1) to measure uplink quality or manage uplink beams or 2) to measure downlink quality for each panel or manage downlink beams using channel reciprocity, the following procedure is required.

A procedure for transmitting one or a plurality of SRS resources for each panel (here, the plurality of SRS resources may be SRS resources transmitted on different beams within one panel or SRS resources repeatedly transmitted on the same beam).

For convenience of description below, a set of SRS resources transmitted based on the same usage and the same time domain behavior in the same panel is referred to as an SRS resource group. The usage may include at least one of beam management, antenna switching, codebook-based PUSCH, or non-codebook based PUSCH. The time-domain behavior may be an operation based on any one of aperiodic, semi-persistent, and periodic.

The SRS resource group may use the configuration for the SRS resource set supported in the Rel-15 NR system, as it is, or separately from the SRS resource set, one or more SRS resources (based on the same usage and time-domain behavior) may be configured as the SRS resource group. In relation to the same usage and time-domain behavior, in the case of Rel-15, a plurality of SRS resource sets may be configured only when the corresponding usage is beam management. It is defined that simultaneous transmission is impossible between SRS resources configured in the same SRS resource set, but simultaneous transmission is possible between the SRS resources belonging to different SRS resource sets.

When considering the panel implementation scheme and multi-panel simultaneous transmission as shown in FIG. 11, the concept described above in connection with the SRS resource set may be directly applied to the SRS resource group. When considering panel switching according to the panel implementation scheme according to FIG. 10, an SRS resource group may be defined separately from the SRS resource set.

For example, a specific ID may be assigned to each SRS resource so that the resources with the same ID belong to the same SRS resource group, and resources with different IDs belong to different resource groups. The term 'panel' as used in the disclosure may be variously interpreted as a 'group of UE antenna elements', 'group of UE antenna ports', or 'group of logical UE antennas'. Various schemes may be taken into account as to what physical/logical antennas or antenna ports are to be tied up and mapped to one panel, given the position/distance/correlation between antennas, the RF configuration, and/or the antenna (port) virtualization scheme. The mapping process may vary depending on the implementation of the UE. Further, as used herein, "panel" may be changed to and interpreted/applied as a "plurality of panels" or a "panel group" (having similarity in a specific characteristic aspect). The following two schemes may be considered to support the above process.

[SRS Configuration Scheme 1]

The base station may configure a plurality of SRS resource groups through a higher layer message. Accordingly, the UE may map different SRS resource groups to different panel(s).

For example, if the base station configures SRS resource group #0 and SRS resource group #1 with RRC, a two panel UE may map each panel to each SRS resource group and transmits SRS from the corresponding panel based on an SRS triggering command of the base station.

Here, 'two SRS resource groups (#0, #1) are configured' may mean that, for a plurality of SRSs having the same usage (antenna switching, beam management, etc.) and the same time-domain behavior (aperiodic, semi-persistent, or periodic), each separate SRS resource group (or SRS resource set) is configured.

According to an embodiment, the UE may report capability information regarding how many SRS resource groups are required for the same usage and the same time-domain behavior to the base station. According to an embodiment, the UE may report capability information regarding how many UL Tx panels are mounted to the base station.

If the base station configures one or a plurality of SRS resource groups to the corresponding UE based on the reported capability information as described above, the mapping between the SRS resource group and the UE's panel may be performed as follows.

For example, based on the implementation of the UE, the corresponding UE may freely map each SRS resource group to the UE panel (or UE panel group).

As another example, the panel (or panel group) to which each SRS resource group is to be mapped may be indicated as the base station assigns an explicit or implicit ID corresponding to each panel (group) to each group.

As another example, the mapping between the SRS resource group and the UE panel (or panel group) may be implicitly designated based on "other characteristics" that are configured differently for each SRS resource group.

As an example of the 'other characteristics', uplink power control (UL power control) may be considered. For example, all or some of uplink power control parameters (e.g., DL RS for pathloss), closed-loop power control parameters (closed-loop power control parameter), and the maximum transmission power (Pc_max) may be configured/designated to differ. Alternatively, an uplink power control process ID (UL power control process ID) may be separately configured for each SRS resource group. The UE may map a panel (or panel group) based on information configured for each SRS resource group.

Specifically, e.g., the maximum transmit power (Pc_max) is different for each panel (or panel group), and related information may be transferred to the base station. The base station may configure a Pc_max value to be applied to each SRS resource group based on the corresponding information. The UE may map a panel (panel group) according to the Pc_max value configured in each SRS resource group.

As another example of the 'other characteristics', uplink timing advance (UL timing advance (TA)) may be considered. In other words, a TA value to be applied during transmission in units of SRS resource groups may be configured/designated differently. For example, the UE may obtain a TA value to be applied to each panel (or panel group) after performing a specific PRACH preamble/occasion or random access procedure (RACH procedure) using each panel (or panel group). If it is separately set which TA value (or the value corresponding to which RACH process) to be applied for each SRS resource group, the corresponding SRS resource group may be transmitted using the panel (or panel group) having transmitted the PRACH.

As another example of the 'other characteristics', the number of antenna ports per panel (or panel group) may be considered. For example, if the UE reports the number of antenna ports required for each panel (or panel group) or each SRS resource group as 2 and 4 differently, mapping between the panel and the SRS resource group may be implicitly performed according to the total number of antenna ports configured for SRS resources belonging to each SRS resource group.

[SRS Configuration Scheme 2]

The base station may configure one (or a plurality of) SRS resource group to the UE through a higher layer message and may indicate, to the UE, the panel (or panel group) to transmit the corresponding SRS resource group through a lower layer message.

Example 1) The base station may configure SRS resource group #0 through an RRC message and may indicate panel #0 through MAC-CE and/or DCI. A two panel UE may transmit SRS in the first panel and, if panel #1 is indicated with MAC-CE and/or DCI, transmits SRS through the second panel.

Example 2) The base station may configure SRS resource group #0 and SRS resource group #1 through the RRC message and may indicate {panel #0, panel #1} through MAC-CE and/or DCI. The UE transmits SRS in resources corresponding to SRS resource group #0 and SRS resource group #1 through the first panel (panel #0) and the second panel (panel #1). If the base station indicates {panel #1, panel #2} to the UE through MAC-CE and/or DCI, the UE transmits the corresponding SRS through the second panel (panel #1) and the third panel (panel #2).

Further, the above-described SRS configuration schemes 1 and 2 may be likewise applied to other UL signals/channels, e.g., PUCCH, PRACH, or PUSCH, as well as SRS. In this case, SRS configuration scheme 1 may be expanded/replaced with UL (e.g., PUCCH, PRACH, PUSCH, etc.) configuration scheme 1, and SRS configuration scheme 2 may be expanded/replaced with UL (e.g., PUCCH, PRACH, PUSCH, etc.) configuration scheme 2. In other words, an uplink resource group (UL resource group) to be applied in the same panel may be configured through a higher layer message (e.g., RRC signaling, MAC-CE, etc.).

The SRS configuration scheme 2 is a scheme in which a plurality of panels may share the same SRS resource group, and since the signaling overhead through a higher layer message is less than that of scheme 1, it is a scheme more suitable for UEs which perform uplink transmission using only one panel at one moment, but inappropriate for UEs in which simultaneous transmission across multi-panel (STxMP) is supported. Conversely, scheme 1 may have a greater signaling burden for SRS configuration but has the advantage of supporting various UE implementations, particularly UEs supporting STxMP.

In the disclosure, the following method is proposed to support implementation of all types of multi-panel UEs as well as UEs performing transmission using only one panel at a time (in particular, UEs implemented based on an RF switch as shown in FIG. 10).

Specifically, the disclosure proposes a method that applies SRS configuration scheme 1 but configures a plurality of SRS resource groups with a higher layer message (e.g., RRC message) and activates/deactivates a specific SRS resource group with a lower layer message (MAC-CE message).

Here, the plurality of SRS resource groups mean that, for the same time-domain behavior (i.e., periodic, semi-static, or aperiodic) and the same usage (e.g., beam management, antenna switching, codebook-based uplink, non-codebook based uplink), a plurality of SRS (and/or PUCCH) resource groups (matching the respective UE panels) may be configured through RRC. Additional signaling for indicating/configuring which SRS resource (group) is mapped to which panel may be introduced.

As an example, the panel (or panel group) to which each SRS resource group is to be mapped may be indicated as the base station assigns an explicit or implicit ID corresponding to each panel (group) to each group.

As another example, the mapping between the SRS resource group and the UE panel (or panel group) may be implicitly designated based on "other characteristics" that are configured differently for each SRS resource group.

As an example of the 'other characteristics', uplink power control (UL power control) may be considered. For example, all or some of uplink power control parameters (e.g., DL RS for pathloss), closed-loop power control parameters (closed-loop power control parameter), and the maximum transmission power (Pc_max) may be configured/designated to differ. Alternatively, an uplink power control process ID (UL power control process ID) may be separately configured for each SRS resource group. The UE may map a panel (or panel group) based on information configured for each SRS resource group. Specifically, the maximum transmit power (Pc_max) is different for each panel (or panel group), and related information may be transferred to the base station. The base station may configure a Pc_max value to be applied to each SRS resource group based on the corresponding information. The UE may map a panel (panel group) according to the Pc_max value configured in each SRS resource group.

As another example of the 'other characteristics', uplink timing advance (UL timing advance (TA)) may be considered. In other words, a TA value to be applied during transmission in units of SRS resource groups may be configured/designated differently. For example, the UE may obtain a TA value to be applied to each panel (or panel group) after performing a specific PRACH preamble/occasion or random access procedure (RACH procedure) using each panel (or panel group). If it is separately set which TA value (or the value corresponding to which RACH process) to be applied for each SRS resource group, the corresponding SRS resource group may be transmitted using the panel (or panel group) having transmitted the PRACH.

As another example of the 'other characteristics', the number of antenna ports per panel (or panel group) may be considered. For example, if the UE reports the number of antenna ports required for each panel (or panel group) or each SRS resource group as 2 and 4 differently, mapping between the panel and the SRS resource group may be implicitly performed according to the total number of antenna ports configured for SRS resources belonging to each SRS resource group.

Hereinafter, the embodiments described below in the disclosure will be described focusing primarily on SRS for convenience, but may be applied to other UL signals/channels, such as PUCCH, PRACH, and PUSCH.

[Proposal 1]

The base station may configure a plurality of SRS resource groups to be transmitted in each panel (and/or panel group) for a multi-panel UE through a higher layer message (e.g., an RRC message) and then activate/deactivate a specific SRS resource group through a lower layer message (MAC-CE and/or DCI).

The UE may operate as follows for the SRS resource(s) belonging to the deactivated SRS resource group.

In the case of periodic or activated semi-persistent (SP) SRS, the UE stops transmission of the corresponding SRS (from a certain point in time) after receiving a deactivation message of the corresponding resource group.

In the case of aperiodic (AP) or deactivated semi-static (SP) SRS, the UE receives the deactivation message of the corresponding resource group (from a certain point in time) and then regards the corresponding resource as an invalid resource.

Operations and/or configuration related to the 'invalid resource' are as follows.

If the UE receives a triggering/activation message for the corresponding resource, the UE may regard this as an incorrect indication and disregard the corresponding transmission indication or perform a predefined operation, other than the corresponding operation (e.g., transmit a specific message/signal to the base station).

Each code-point constituting the triggering/activation message may be defined to be configured, with invalid resources excluded (see proposal 1-1 below for specific details).

The UE may operate as follows for the SRS resource(s) belonging to the activated SRS resource group(s).

In the case of periodic SRS, the UE starts SRS transmission (from a certain point in time) after receiving the activation message of the corresponding resource group.

In the case of semi-persistent SRS, the UE may operate according to option 1 and/or option 2 as follows.

Option 1)

1) If the corresponding SRS resource belongs to a previously activated SRS resource group and a semi-static SRS deactivation message is not separately received at the time the corresponding resource group is deactivated, the UE receives a resource group activation message and then (from a certain point in time) resumes transmission of the corresponding SRS resource.

2) Otherwise (that is, if the resource group or resource has never been activated or if a semi-static (SP) SRS deactivation message for the resource is separately received), the UE receives the resource group activation message and, if (then) receiving a (separate) semi-static SRS activation message, starts transmission of the semi-static SRS (SP SRS) in the corresponding SRS resource from a predetermined time.

Option 2)

If the UE receives the resource group activation message and (then) receives a (separate) SRS activation message, the UE starts transmission of the semi-static SRS (SP SRS) starts from a predetermined time. The SRS activation message for the specific SP SRS resource may be included and transmitted in the SRS resource group activation message.

In the case of an aperiodic SRS (AP SRS), if receiving a resource group activation message and (then) a (separate) aperiodic SRS triggering DCI (AP SRS triggering DCI), the UE transmits the corresponding SRS at a predetermined time. The aperiodic SRS triggering message for the specific AP SRS resource may be included and transmitted in the SRS resource group activation message.

In the proposed scheme, a signal to be activated/deactivated may be applied to other UL signals/channels as well as SRS. The UL signal/channel may include PUCCH resource(s)/resource group(s), PRACH resource(s) or (grant-free or SPS) PUSCH. However, without being limited thereto, the UL signal/channel may include a UL signal/channel (connected/configured to be transmitted to a specific panel).

For example, if an explicit or implicit ID is introduced for panel (group) classification as described above, all SRS, PUCCH, PUSCH, and PRACH resources corresponding to the ID may be the target of activation/deactivation. To this end, a method for directly using the corresponding ID as a target for activation/deactivation (i.e., indicating an activation/deactivation target through the ID) may be considered.

As another example, the activation/deactivation message itself may be configured/specified to indicate a specific SRS resource (group)(s). Other uplink resources (e.g., PUCCH, PUSCH, PRACH resources) configured to use the same panel as the corresponding SRS resource (group)(s) may be configured/specified to be automatically included as targets for activation/deactivation. Additionally, UL signals belonging to the same resource group (or corresponding to the same panel ID) may be controlled through the same power control process and/or the same uplink transmission timing control.

[Proposal 1-1]

The SRS resource candidate group may be automatically configured with SRS resource(s) in the activated SRS resource group.

The 'SRS resource candidate group' may be related to at least one of an SRS resource in terms of spatial relation, an SRS resource that is a reference for uplink transmission, or an SRS resource in which an actual SRS is transmitted. The 'SRS resource candidate group' may be at least one SRS resource(s) configured through a higher layer message in relation to the following operations.

Configuration of one or more SRS resources through a higher layer message

Indicates one (or a plurality of) specific SRS resource among SRS resources configured through a lower layer message (in spatial relation, as an RS serving as a reference for PUSCH transmission, or as an SRS resource to be actually transmitted from among the candidate groups)

Specifically, the SRS resource candidate group may at least one SRS resource(s) applied to AP SRS triggering, SP SRS activation/deactivation, SRI field for codebook/non-codebook based PUSCH, SRIs in spatial relation information for PUCCH/SRS, and/or a new RRC/MAC-CE/DCI field including SRS (candidate) resources.

Here, the resource candidate group is not limited only to the SRS resource. In other words, the configured candidate group is not constituted only of SRS resource(s). For example, like spatial relation information, downlink RS resources may also be configured to belong to the corresponding resource pool. Thereafter, one (or a plurality of) DL/UL RS resource(s) among the DL/UL RS resource(s) configured through the lower layer message may be indicated.

Embodiment 1) In case of aperiodic SRS triggering (AP SRS triggering), each codepoint of the aperiodic SRS triggering DCI (AP SRS triggering DCI) may be automatically composed only of resources belonging to the activated SRS resource group.

For example, each SRS codepoint configured with RRC for aperiodic SRS triggering (AP SRS triggering) may be constituted only of a local resource (set) index(es) within the SRS resource group and, if the activated resource group is changed, the local index within the resource group may be indicated without a separate indication. Or, each of the SRS resource (set) index(es) indicated by a specific codepoint for each resource group hypothesis activated with RRC (or a resource group candidate which has a chance of being activated) may be configured and then, depending on the activated SRS resource group circumstance, the codepoint may be interpreted differently. The same scheme as in embodiment 1 may be applied to semi-static SRS (SP SRS).

Embodiment 2) Up to two SRS resources based on Rel-15 may be configured for codebook based PUSCH transmission. In relation to the above usage, it may be extended so that up to two SRS resources may be configured for each activated SRS resource group hypothesis.

For example, if each SRS resource group is activated for a two panel UE with panel switching only, up to two codebook based PUSCH SRS resources to be indicated are configured through RRC (that is, a total of 4 SRS resources are configured). In this case, depending on the activated SRS resource group situation, each codepoint of the 1-bit SRI field included in DCI format 0_1 may indicate the SRS resource(s) configured in the corresponding SRS resource group according to which SRS resource group is activated.

Embodiment 3) A set of SRS resource candidates that may be configured/indicated with spatial relation info of PUCCH/SRS may be changed according to the activated SRS resource group.

For example, if a total of 8 SRS resources set as usage='beam management' are configured so that 4 belong to resource group #0 and the remaining 4 belong to resource group #1, the UE may transmit the first 4 SRS resources in a specific panel and the remaining 4 SRS resources in another panel. In this case, if only resource group #0 is activated, the SRS resources constituting the spatial relation information for PUCCH/SRS are automatically configured with only top 4 SRS resources (configured to belong to resource group #0) so that the payload size required for spatial relation info may be reduced from 3 bits to 2 bits. Or, if the codepoint mapping is maintained, but it is indicated for an invalid SRS resource is indicated, this may be defined/configured as recognized as a malfunction by the UE.

[Proposal 1-2]

The PUCCH resource corresponding to each codepoint indicated by the PUCCH resource indicator (PRI) of the DCI field may be automatically configured with PUCCH resources in the activated PUCCH resource group.

Further, if it is considered that the target of activation/deactivation extends not only to SRS but also to other UL signals/channels, a scheme similar to the above method may be applied to PUCCH and the like. As an example, for a DCI field (e.g., PUCCH resource indicator in DCI format 1_0 and 1_1) that dynamically indicates HARQ ACK/NACK PUCCH in the NR system, the PUCCH resource to which each DCI codepoint is mapped is configured with RRC. Depending on the activation/deactivation situation of the panel, the PUCCH resource mapped to a specific DCI codepoint may be changed (to the PUCCH resource transmitted from the activated panel) (e.g., after configuring each PUCCH resource set(s) with RRC for each activated panel candidate, applies the corresponding PUCCH resource set(s) depending on the actually activated panel state. See TS 38.213 for HARQ ACK/NACK PUCCH resource set(s)-related operations)

[Proposal 1-3]

In application of proposal 1, the completion time of resource group activation/deactivation may be specified as a time delayed from the time indicated (or received) for activation/deactivation (for a UE with a specific capability) by the sum of component 1 and component 2 or the larger of component 1 and component 2.

Component 1 is the (maximum) time required for interpretation of the activation/deactivation indication message. The time required to interpret the message may mean a time required for the UE to decode the message.

When the corresponding indication is MAC-CE, a specific (fixed) time (e.g., 3 msec) may be specified with respect to the time of transmission of an ACK for the PDSCH containing the corresponding MAC-CE message.

When the corresponding (final) indication is DCI, it may be specified as a fixed value corresponding to the time required for DCI interpretation (decoding) compared to the time of the last symbol of the PDCCH containing the DCI (e.g., minimum scheduling offset for PDSCH) or a value varied depending on DCI calculation speed-related UE capability.

Component 2 is a time required for panel activation and/or panel switching.

The time may be defined/configured to differ according to the panel implementation scheme (i.e., UE capability) of the UE and/or the power saving status of the panel to be activated. In the latter case (related to the panel power saving status), latency according to the panel power saving status or activation status, such as 0, 1, 2, or 3 msec, may be defined/configured. For example, it may be specified/configured to apply the largest latency when the panel is in fully power of status, an intermediate value when the panel is in power reduction status, or 0 to component 2 when the panel is in power on or transmission ready status (e.g., the UE implementation status as shown in FIG. 11).

According to an embodiment, the resource group activation/deactivation completion time may be specified as the sum of the two components (component 1 and component 2). This embodiment may be applied based on the case where component 1 is set as a tight value for implementation (that is, it is set tight so that there is little difference between the time required for the operation and the component 1). This is so done considering the fact that panel activation/panel switching is performed after the activation/deactivation indication message is interpreted.

According to an embodiment, the resource group activation/deactivation completion time may be specified as the largest value among values based on the two components (component 1 and component 2). This embodiment may be applied based on the case where component 1 is set as a conservative value (e.g., 3 msec) considering not only the time required for UE computation but also message reception errors.

According to an embodiment, the resource group activation/deactivation completion time may be based on a function using the two components (component 1 and component 2). For example, the completion time may be based on a weighted average value using the two components.

In terms of implementation, operations (e.g., operations related to transmission of an uplink signal based on at least one of configuration method 1, configuration method 2, proposal 1, proposal 1-1, proposal 1-2, and proposal 1-3) of the base station/UE according to the above-described embodiments may be processed by the device (e.g., the processors 102 and 202 of FIG. 15) of FIGS. 15 to 19 described below.

Further, operations (e.g., operations related to transmission of an uplink signal based on at least one of configuration method 1, configuration method 2, proposal 1, proposal 1-1, proposal 1-2, and proposal 1-3) of the base station/UE according to the above-described embodiment may be stored in a memory (e.g., 104 or 204 of FIG. 15) in the form of instruction/program (e.g., instructions, executable codes) for driving at least one processor (e.g., 102 or 202 of FIG. 15).

Hereinafter, with reference to FIG. 12, the above-described embodiments are described in detail in terms of signaling between the UE and the base station.

FIG. 12 is a flowchart for describing signaling of uplink transmission considering multi-panel according to an embodiment of the disclosure.

FIG. 12 is intended merely for illustration purposes but not for limiting the scope of the disclosure. Referring to FIG. 12, it is assumed that a UE and/or a base station (BS) supports multipanel-based signal/channel transmission/reception. Further, some of the steps shown in FIG. 12 may be omitted considering UE/BS implementation and/or previously defined rules.

The UE may report UE capability information related to multi-panel-based signal/channel transmission/reception to the BS (through higher layer signaling) (S1210). As an example, as described above (e.g., related to the above-described SRS configuration schemes 1 and 2, proposal 1), the UE capability information may be the number of UL resource groups that the UE may support (e.g., SRS/PUCCH/PUSCH/PRACH resource/occasion/sequence/layer group, etc.) and/or the number of (UL Tx) panels that the UE may support.

The UE may receive a panel-related configuration (i.e., a panel-related configuration) from the BS (S1220). Here, the corresponding configuration may include information for at least one of the aforementioned configuration for the UL resource group, configuration related to the panel, or configuration/mapping relationship between the UL resource group and the panel. The corresponding configuration may be transferred through higher layer signaling (e.g., RRC signaling).

As a specific example, as in the above-described SRS configuration schemes ½ and/or the above-described proposals 1/1-1/1-2/1-3, the corresponding configuration may include information for the SRS resource group, the panel-related information, and information for the mapping relationship between the SRS resource group and the panel. In this case, the corresponding configuration may also include information (e.g., parameter (set)) related to power control for each SRS resource group/panel.

As another specific example, as described above, if SRS configuration schemes ½ and/or the above-described proposals 1/1-1/1-2/1-3 are extended to other UL signals/channels (e.g., PUCCH, PUSCH, PRACH, etc.), the corresponding configuration may include information for at least one of information for the UL resource group, information related to the panel, or the mapping relationship between the UL resource group and the panel. Here, the mapping relationship may be an explicit mapping relationship between UL resource group and panel or an implicit mapping relationship via an SRS resource group. In this case, the corresponding configuration may also include information (e.g., parameter (set)) related to power control for each UL resource group/panel.

The UE may receive information for panel-related activation/deactivation from the BS (S1230). In this case, the information for activation/deactivation may be transferred through MAC-CE and/or DCI. For example, as in the above-described proposal 1, a MAC-CE message and/or DCI for activating/deactivating a specific UL resource group(s) among the UL resource group(s) configured through the previous procedure (e.g., S1220) may be received.

Thus, the UE may determine activation/deactivation related to the panel (S1240). In other words, the UE may determine whether to activate/deactivate specific UL resource group(s). In this case, activation/deactivation may be performed in units of UL resource groups. Depending on whether activated/deactivated, the UE may be configured to perform or stop UL transmission (e.g., refer to the above-described proposal 1). Further, the completion time of the activation/deactivation may be determined as in the above-described proposal 1-3, and a UL resource candidate group (e.g., the SRS resource candidate group of proposal 1-1 and the PUCCH resource group (or PUCCH resource set(s)) of proposal 1-2) that is applicable to UL transmission may be configured considering the activation/deactivation (e.g., embodiment 1 to embodiment 3 of proposal 1-1 and proposal 1-2).

The UE may perform UL transmission using the UL resource(s) corresponding to/belonging to the activated panel(s) (i.e., the UL resource group(s)) or may stop/disregard transmission in the UL resource(s) corresponding to/belonging to the deactivated panel(s) (i.e., UL resource group(s)).

The operations of the BS and/or UE described in connection therewith may be implemented by a device (of, e.g., FIGS. 15 to 19) described below. For example, the BS may correspond to a transmission device, and the UE may correspond to a reception device and, in some cases, vice versa.

Referring to FIG. 16 related to the operation of the UE 100, at least one processor 102 may control to transmit/receive a signal/channel (e.g., configuration, indication, UE capability, SRS/PUCCH/PUSCH/PRACH) through at least one transceiver 106 and to perform decoding/encoding for the signal/channel. In this process, the UE 100 may use at least one memory 104 and may store the decoded/encoded data in the at least one memory 104. In the case of the BS 200, at least one processor 202 may control to transmit/receive a signal/channel (e.g., configuration, indication, UE capability, SRS/PUCCH/PUSCH/PRACH) through at least one transceiver 206 and to perform decoding/encoding for the signal/channel. In this process, the BS 200 may use at least one memory 204 and may store the decoded/encoded data in the at least one memory 204.

The above-described embodiments are described below in detail with reference to FIG. 13 in terms of the operation of the UE. Further, the embodiments and/or methods described in the disclosure are differentiated solely for ease of description, and some components in any one method may be replaced, or combined with components of another method.

FIG. 13 is a flowchart illustrating a method for transmitting an uplink signal by a UE in a wireless communication system according to an embodiment of the disclosure.

Referring to FIG. 13, a method for transmitting an uplink signal by a UE in a wireless communication system according to an embodiment of the disclosure may include the steps of receiving a higher layer message (S1310), receiving a lower layer message (S1320), and transmitting an uplink signal (S1330).

In operation S1310, the UE receives a higher layer message related to a configuration of resource groups for a plurality of panels. The higher layer message may be an RRC message.

According to an embodiment, the resource group may be an SRS resource group. The SRS resource groups may be identical in at least one of a usage or a time domain behavior.

The usage may include at least one of antenna switching, beam management, codebook based uplink (UL), or non-codebook based UL.

The time domain behavior may be an operation based on any one of periodic, aperiodic, and semi-persistent.

According to an embodiment, a different resource group may be mapped to each of the plurality of panels based on the characteristics of the resource group. In this case, the characteristics may be related to power control or timing advance.

According to an embodiment, a different resource group may be mapped to each of the plurality of panels. In this case, the mapping may be based on the number of antenna ports of each panel among the plurality of panels.

The operation of receiving a higher layer message related to configuration of resource groups for a plurality of panels from the base station (100/200 of FIGS. 15 to 19) by the UE (100/200 of FIGS. 15 to 19) according to the above-described S1310 may be implemented by the device of FIGS. 15 to 19. For example, referring to FIG. 16, one or more processors 102 may control one or more transceivers 106 and/or one or more memories 104 to receive the higher layer message related to configuration of the resource groups for the plurality of panels from the base station 200.

In S1320, the UE receives a lower layer message related to whether the resource groups are activated from the base station. The lower layer message may be a MAC-CE message or downlink control information (DCI).

According to an embodiment, transmission of the uplink signal based on a deactivated resource group may be stopped from a specific time, based on the resource group being periodically or semi-statically scheduled. The deactivated resource group may be regarded as an invalid resource from the specific time based on the resource group being aperiodically scheduled.

According to an embodiment, the specific time may be a time delayed by a predetermined value from the time at which the lower layer message is received. The predetermined value may be determined based on at least one of a first time or a second time.

The first time may be a time required for decoding the lower layer message. The second time may be a time required for an operation for a panel based on the lower layer message among the plurality of panels. The operation of the panel may be based on at least one of activation of the panel or panel switching.

The operation of receiving a lower layer message related to whether to activate the resource groups from the base station (100/200 of FIGS. 15 to 19) by the UE (100/200 of FIGS. 15 to 19) according to the above-described S1320 may be implemented by the device of FIGS. 15 to 19. For example, referring to FIG. 16, one or more processors 102 may control one or more transceivers 106 and/or one or more memories 104 to receive the lower layer message related to whether to activate the resource groups from the base station 200.

In S1330, the UE transmits an uplink signal to the base station based on the lower layer message. The uplink signal may be transmitted based on an activated resource group among the resource groups.

According to an embodiment, the uplink signal may be based on any one of a sounding reference signal (SRS), a physical uplink shared channel (PUSCH), a physical uplink control channel (PUCCH), or a physical random access channel (PRACH).

According to an embodiment, the activated resource group may be related to spatial relation information related to the transmission of the uplink signal or an uplink resource where the uplink signal is transmitted.

The operation of transmitting an uplink signal to the base station (100/200 of FIGS. 15 to 19) by the UE (100/200 of FIGS. 15 to 19) based on the higher layer message according to S1330 described above may be implemented by the device of FIGS. 15 to 19. For example, referring to FIG. 16, one or more processors 102 may control one or more transceivers 106 and/or one or more memories 104 to transmit the uplink signal to the base station 200 based on the higher layer message.

The above-described embodiments are described below in detail with reference to FIG. 14 in terms of the operation of the base station. Further, the embodiments and/or methods described in the disclosure are differentiated solely for ease of description, and some components in any one method may be replaced, or combined with components of another method.

FIG. 14 is a flowchart illustrating a method for receiving an uplink signal by a base station in a wireless communication system according to another embodiment of the disclosure.

Referring to FIG. 14, a method for receiving an uplink signal by a base station in a wireless communication system according to another embodiment of the disclosure may include the steps of transmitting a higher layer message (S1410), transmitting a lower layer message (S1420), and receiving an uplink signal (S1430).

In operation S1410, the base station transmits a higher layer message related to a configuration of resource groups for a plurality of panels. The higher layer message may be an RRC message.

According to an embodiment, the resource group may be an SRS resource group. The SRS resource groups may be identical in at least one of a usage or a time domain behavior.

The usage may include at least one of antenna switching, beam management, codebook based uplink (UL), or non-codebook based UL.

The time domain behavior may be an operation based on any one of periodic, aperiodic, and semi-persistent.

According to an embodiment, a different resource group may be mapped to each of the plurality of panels based on the characteristics of the resource group. In this case, the characteristics may be related to power control or timing advance.

According to an embodiment, a different resource group may be mapped to each of the plurality of panels. In this case, the mapping may be based on the number of antenna ports of each panel among the plurality of panels.

The operation of transmitting a higher layer message related to configuration of resource groups for a plurality of panels to the UE (100/200 of FIGS. 15 to 19) by the base station (100/200 of FIGS. 15 to 19) according to the above-described S1410 may be implemented by the device of FIGS. 15 to 19. For example, referring to FIG. 16, one or more processors 202 may control one or more transceivers 206 and/or one or more memories 204 to transmit the higher layer message related to configuration of the resource groups for the plurality of panels to the UE 100.

In S1420, the base station transmits a lower layer message related to whether the resource groups are activated to the UE. The lower layer message may be a MAC-CE message or downlink control information (DCI).

According to an embodiment, transmission of the uplink signal based on a deactivated resource group may be stopped from a specific time, based on the resource group being periodically or semi-statically scheduled. The deactivated resource group may be regarded as an invalid resource from the specific time based on the resource group being aperiodically scheduled.

According to an embodiment, the specific time may be a time delayed by a predetermined value from the time at which the lower layer message is received. The predetermined value may be determined based on at least one of a first time or a second time.

The first time may be a time required for decoding the lower layer message. The second time may be a time required for an operation for a panel based on the lower layer message among the plurality of panels. The operation of the panel may be based on at least one of activation of the panel or panel switching.

The operation of transmitting a lower layer message related to whether to activate the resource groups to the UE (100/200 of FIGS. 15 to 19) by the base station (100/200 of FIGS. 15 to 19) according to the above-described S1420 may be implemented by the device of FIGS. 15 to 19. For example, referring to FIG. 16, one or more processors 202 may control one or more transceivers 206 and/or one or more memories 204 to transmit the lower layer message related to whether to activate the resource groups to the UE 100.

In S1430, the base station receives an uplink signal from the UE based on the lower layer message. The uplink signal may be transmitted based on an activated resource group among the resource groups.

According to an embodiment, the uplink signal may be based on any one of a sounding reference signal (SRS), a physical uplink shared channel (PUSCH), a physical uplink control channel (PUCCH), or a physical random access channel (PRACH).

According to an embodiment, the activated resource group may be related to spatial relation information related to the transmission of the uplink signal or an uplink resource where the uplink signal is transmitted.

The operation of receiving an uplink signal based on the higher layer message from the UE (100/200 of FIGS. 15 to 19) by the base station (100/200 of FIGS. 15 to 19) according to S1430 described above may be implemented by the device of FIGS. 15 to 19. For example, referring to FIG. 16, one or more processors 202 may control one or more transceivers 206 and/or one or more memories 204 to receive the uplink signal based on the higher layer message from the UE 100.

Example of Communication System Applied to Disclosure

The various descriptions, functions, procedures, proposals, methods, and/or operational flowcharts of the disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 15 illustrates a communication system 1 applied to the disclosure.

Referring to FIG. 15, a communication system 1 applied to the disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the disclosure.

Example of Wireless Device Applied to the Disclosure.

FIG. 16 illustrates wireless devices applicable to the disclosure.

Referring to FIG. 16, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 15.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Example of Signal Processing Circuit Applied to the Disclosure

FIG. 17 illustrates a signal process circuit for a transmission signal.

Referring to FIG. 17, a signal processing circuit 1000 may include scramblers 1010, modulators 1020, a layer mapper 1030, a precoder 1040, resource mappers 1050, and signal generators 1060. An operation/function of FIG. 17 may be performed, without being limited to, the processors 102 and 202 and/or the transceivers 106 and 206 of FIG. 16. Hardware elements of FIG. 17 may be implemented by the processors 102 and 202 and/or the transceivers 106 and 206 of FIG. 16. For example, blocks 1010 to 1060 may be implemented by the processors 102 and 202 of FIG. 16. Alternatively, the blocks 1010 to 1050 may be implemented by the processors 102 and 202 of FIG. 16 and the block 1060 may be implemented by the transceivers 106 and 206 of FIG. 16.

Codewords may be converted into radio signals via the signal processing circuit 1000 of FIG. 17. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 17. For example, the wireless devices (e.g., 100 and 200 of FIG. 16) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of Application of Wireless Device Applied to the Disclosure

FIG. 18 illustrates another example of a wireless device applied to the disclosure.

The wireless device may be implemented in various forms according to a use-case/service (refer to FIG. 15). Referring to FIG. 18, wireless devices 100 and 200 may correspond to the wireless devices 100 and 200 of FIG. 16 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 16. For example, the transceiver(s) 114 may include the one or more transceivers 106 and 206 and/or the one or more antennas 108 and 208 of FIG. 16. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 15), the vehicles (100b-1 and 100b-2 of FIG. 15), the XR device (100c of FIG. 15), the hand-held device (100d of FIG. 15), the home appliance (100e of FIG. 15), the IoT device (100f of FIG. 15), a digital broadcast terminal, a hologram device, a public safety device, an MTC device, a medicine device, a fintech device (or a finance device), a security device, a climate/environment device, the AI server/device (400 of FIG. 15), the BSs (200 of FIG. 15), a network node, etc. The wireless device may be used in a mobile or fixed place according to a use-example/service.

In FIG. 18, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of Hand-Held Device Applied to the Disclosure

FIG. 19 illustrates a hand-held device applied to the disclosure.

The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 19, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 18, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

The uplink signal transmission method and device in a wireless communication system according to embodiments of the disclosure provide the following effects.

According to an embodiment of the disclosure, an uplink signal is transmitted based on an activated resource group among resource groups for a plurality of panels. Accordingly, even when the radio channel state is different for each panel or the antenna configuration of the UE is different for each panel, the uplink signal may be effectively transmitted.

According to an embodiment of the disclosure, the resource groups for the plurality of panels may be configured through a higher layer message, and it is indicated whether the resource groups are activated through a lower layer message. Therefore, it is possible to support both a UE in which only one panel is active at a time and a UE capable of simultaneous transmission across multi-panel (STxMP).

The embodiments of the disclosure described hereinbelow are combinations of elements and features of the disclosure. The elements or features may be considered selective unless otherwise mentioned. Each element or feature may be practiced without being combined with other elements or features. Further, an embodiment of the disclosure may be constructed by combining parts of the elements and/or features. Operation orders described in embodiments of the disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the disclosure or included as a new claim by subsequent amendment after the application is filed.

The embodiments of the disclosure may be achieved by various means, for example, hardware, firmware, software, or a combination thereof. In a hardware configuration, the methods according to the embodiments of the disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the disclosure may be implemented in the form of a module, a procedure, a function, etc. For example, software code may be stored in a memory unit and executed by a processor. The memories may be located at the interior or exterior of the processors and may transmit data to and receive data from the processors via various known means.

Those skilled in the art will appreciate that the disclosure may be carried out in other specific ways than those set forth herein without departing from the spirit and essential characteristics of the disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A method of transmitting an uplink signal by a user equipment (UE) in a wireless communication system, the method comprising:
   receiving a higher layer message related to a configuration of resource groups for a plurality of panels;
   receiving a lower layer message related to whether the resource groups are activated; and
   transmitting the uplink signal based on the lower layer message, wherein the uplink signal is transmitted based on an activated resource group among the resource groups,
   wherein the uplink signal is transmitted after an average period of a first period and a second period from a time point of receiving the lower layer message,
   wherein the first period is a first product of a first time and a first weight, and the second period is a second product of a second time and a second weight,
   wherein the first time is a time required to decode the lower layer message, and the second time is a time required to activate a panel related to the activated resource group among the plurality of panels.

2. The method of claim 1, wherein the resource groups are SRS resource groups.

3. The method of claim 2, wherein the SRS resource groups are identical in at least one of a usage or a time domain behavior.

4. The method of claim 3, wherein the usage includes at least one of antenna switching, beam management, codebook based uplink (UL), or non-codebook based UL.

5. The method of claim 3, wherein the time domain behavior is an operation based on any one of periodic, aperiodic, and semi-persistent.

6. The method of claim 1, wherein a different resource group is mapped to each of the plurality of panels based on a characteristic of the resource groups, and wherein the characteristic relates to power control or timing advance.

7. The method of claim 1, wherein a different resource is mapped to each of the plurality of panels, and wherein the mapping is based on a number of antenna ports of each of the plurality of panels.

8. The method of claim 1, wherein transmission of the uplink signal based on a deactivated resource group is stopped from a specific time, based on the resource group being periodically or semi-statically scheduled, and wherein the deactivated resource group is regarded as an invalid resource from the specific time based on the resource group being aperiodically scheduled.

9. The method of claim 8, wherein the specific time is a time delayed by a predetermined value from the time point of receiving the lower layer message, and wherein the predetermined value is determined based on at least one of the first time or the second time.

10. The method of claim 1, wherein the uplink signal is based on any one of a sounding reference signal (SRS), a physical uplink shared channel (PUSCH), a physical uplink control channel (PUCCH), or a physical random access channel (PRACH).

11. The method of claim 1, wherein the activated resource group is related to spatial relation information related to the transmission of the uplink signal or an uplink resource where the uplink signal is transmitted.

12. A UE transmitting an uplink signal in a wireless communication system, the UE comprising:
one or more transceivers;
one or more processors; and
one or more memories operably connectible to the one or more processors and storing instructions to, when the transmission of the uplink signal is executed by the one or more processors, perform operations, wherein the operations include:
receiving a higher layer message related to a configuration of resource groups for a plurality of panels;
receiving a lower layer message related to whether the resource groups are activated; and
transmitting the uplink signal based on the lower layer message, wherein the uplink signal is transmitted based on an activated resource group among the resource groups,
wherein the uplink signal is transmitted after an average period of a first period and a second period from a time point of receiving the lower layer message,
wherein the first period is a first product of a first time and a first weight, and the second period is a second product of a second time and a second weight,
wherein the first time is a time required to decode the lower layer message, and the second time is a time required to activate a panel related to the activated resource group among the plurality of panels.

13. The UE of claim 12, wherein the resource groups are SRS resource groups.

14. The UE of claim 13, wherein the SRS resource groups are identical in at least one of a usage or a time domain behavior.

15. The UE of claim 12, wherein a different resource group is mapped to each of the plurality of panels based on a characteristic of the resource groups, and wherein the characteristic relates to power control or timing advance.

16. The UE of claim 12, wherein transmission of the uplink signal based on a deactivated resource group is stopped from a specific time, based on the resource group being periodically or semi-statically scheduled, and wherein the deactivated resource group is regarded as an invalid resource from the specific time based on the resource group being aperiodically scheduled.

17. One or more non-transitory computer-readable media storing one or more instructions, wherein the one or more instructions executable by one or more processors are configured to control a UE to:
receive a higher layer message related to a configuration of resource groups for a plurality of panels;
receive a lower layer message related to whether the resource groups are activated; and
transmit the uplink signal based on the lower layer message, wherein the uplink signal is transmitted based on an activated resource group among the resource groups,
wherein the uplink signal is transmitted after an average period of a first period and a second period from a time point of receiving the lower layer message,
wherein the first period is a first product of a first time and a first weight, and the second period is a second product of a second time and a second weight,
wherein the first time is a time required to decode the lower layer message, and the second time is a time required to activate a panel related to the activated resource group among the plurality of panels.

* * * * *